(12) United States Patent
Lawson et al.

(10) Patent No.: US 12,379,545 B2
(45) Date of Patent: Aug. 5, 2025

(54) METHOD AND SYSTEM FOR ALIGNING AND POSITIONING AN OPTICAL FIBER AND MICROLENS ARRAY

(71) Applicant: RAM Photonics Industrial, LLC, Webster, NY (US)

(72) Inventors: Joseph Lawson, Rochester, NY (US); Christopher P. Brophy, Pittsford, NY (US); Jordan Leidner, Rochester, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 262 days.

(21) Appl. No.: 18/125,633

(22) Filed: Mar. 23, 2023

(65) Prior Publication Data

US 2023/0305232 A1 Sep. 28, 2023

Related U.S. Application Data

(60) Provisional application No. 63/323,655, filed on Mar. 25, 2022, provisional application No. 63/324,445, filed on Mar. 28, 2022.

(51) Int. Cl.
*G02B 6/255* (2006.01)
*G01B 11/26* (2006.01)

(52) U.S. Cl.
CPC ............ *G02B 6/2555* (2013.01); *G01B 11/26* (2013.01)

(58) Field of Classification Search
None
See application file for complete search history.

(56) References Cited

U.S. PATENT DOCUMENTS

| 5,135,590 A | 8/1992 | Basavanhally et al. |
| 5,140,167 A | 8/1992 | Shaar et al. |
| 5,340,371 A | 8/1994 | Dyott |

(Continued)

FOREIGN PATENT DOCUMENTS

| JP | 3853841 B6 | 4/2007 |
| JP | 2015075651 A | 4/2015 |

(Continued)

OTHER PUBLICATIONS

PCT/US2023/016088, "International Search Report and the Written Opinion", Aug. 31, 2023, 9 pages.

(Continued)

*Primary Examiner* — Jerry Rahll
(74) *Attorney, Agent, or Firm* — KILPATRICK TOWNSEND & STOCKTON LLP

(57) ABSTRACT

Systems and methods for aligning an optical fiber are provided herein. The method may include providing an optical fiber having a first end and a second end, where the first end of the optical fiber has a predefined manufacturing property. For example, the predefined manufacturing property of the first end of the optical fiber may include a predefined cleave angle. The method may also include positioning the optical fiber such that the first end of the optical fiber faces a microlens array (MLA) alignment system. In an example embodiment, the MLA alignment system may include a tilt sensing device and a position sensing device. The method may also include emitting a light beam from the first end of the optical fiber toward the MLA alignment system.

20 Claims, 19 Drawing Sheets

(56) References Cited

U.S. PATENT DOCUMENTS

| | | | |
|---|---|---|---|
| 5,346,583 | A | 9/1994 | Basavanhally |
| 5,506,928 | A | 4/1996 | Evans et al. |
| 5,871,559 | A | 2/1999 | Bloom |
| 5,926,594 | A | 7/1999 | Song et al. |
| 6,587,618 | B2 | 7/2003 | Raguin et al. |
| 6,633,700 | B2 * | 10/2003 | Bellman .............. G02B 6/3582 385/119 |
| 8,110,791 | B2 | 2/2012 | Laycock et al. |
| 2003/0031409 | A1 | 2/2003 | Bellman et al. |
| 2011/0066217 | A1 | 3/2011 | Diller et al. |
| 2013/0120760 | A1 | 5/2013 | Raguin et al. |
| 2017/0214839 | A1 * | 7/2017 | Keller ................... H04N 23/56 |
| 2021/0199550 | A1 | 7/2021 | Urey et al. |
| 2022/0069537 | A1 | 3/2022 | Travers et al. |

FOREIGN PATENT DOCUMENTS

| | | | |
|---|---|---|---|
| WO | 2023183493 | A2 | 9/2023 |
| WO | 2023183493 | A3 | 11/2023 |

OTHER PUBLICATIONS

Application No. PCT/US2023/015178, "International Search Report and Written Opinion", Jun. 27, 2023, 7 pages.

Application No. PCT/US2023/016088, "Invitation to Pay Additional Fees and, Where Applicable, Protest Fee", Jun. 22, 2023, 2 pages.

U.S. Appl. No. 18/125,639, "Non-Final Office Action", Nov. 4, 2024, 17 pages.

PCT/US2023/015178, "International Preliminary Report on Patentability", Sep. 26, 2024, 6 pages.

PCT/US2023/016088, "International Preliminary Report on Patentability", Oct. 10, 2024, 6 pages.

U.S. Appl. No. 18/121,448, "Notice of Allowance", Feb. 6, 2025, 14 pages.

U.S. Appl. No. 18/125,639, "Final Office Action", Feb. 21, 2025, 17 pages.

EP23771315.1, "Extended European Search Report", May 22, 2025, 7 pages.

\* cited by examiner

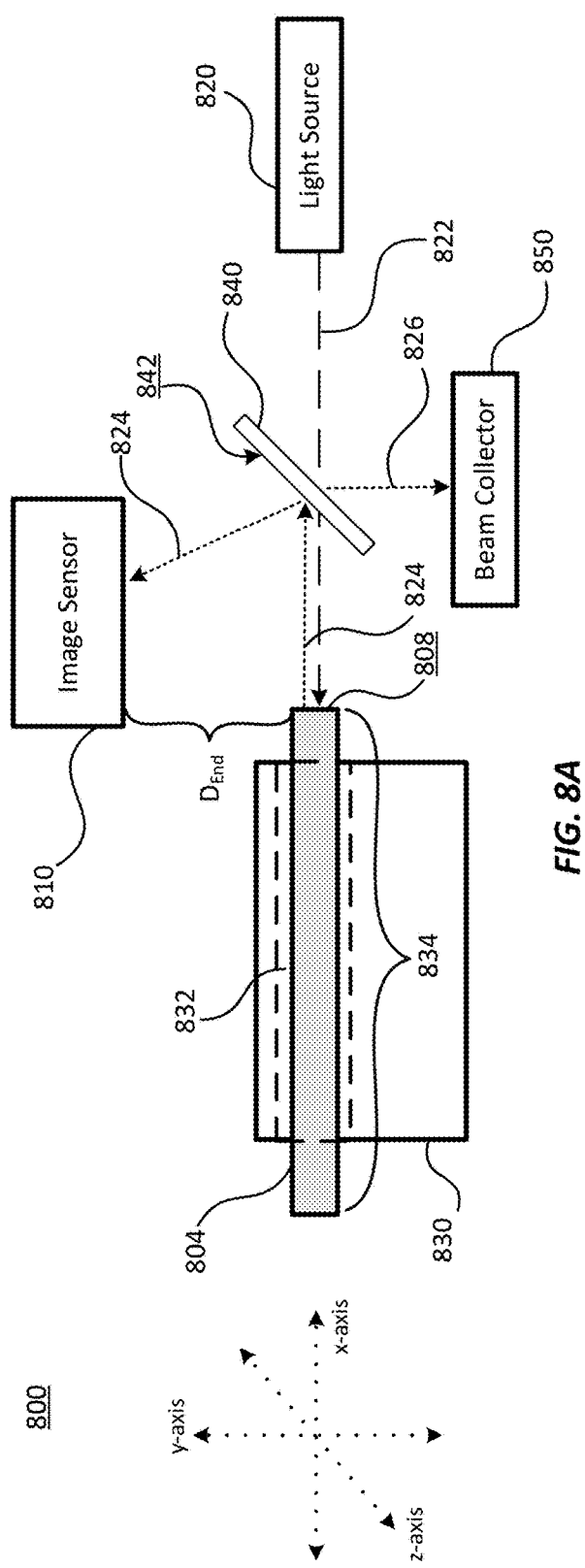
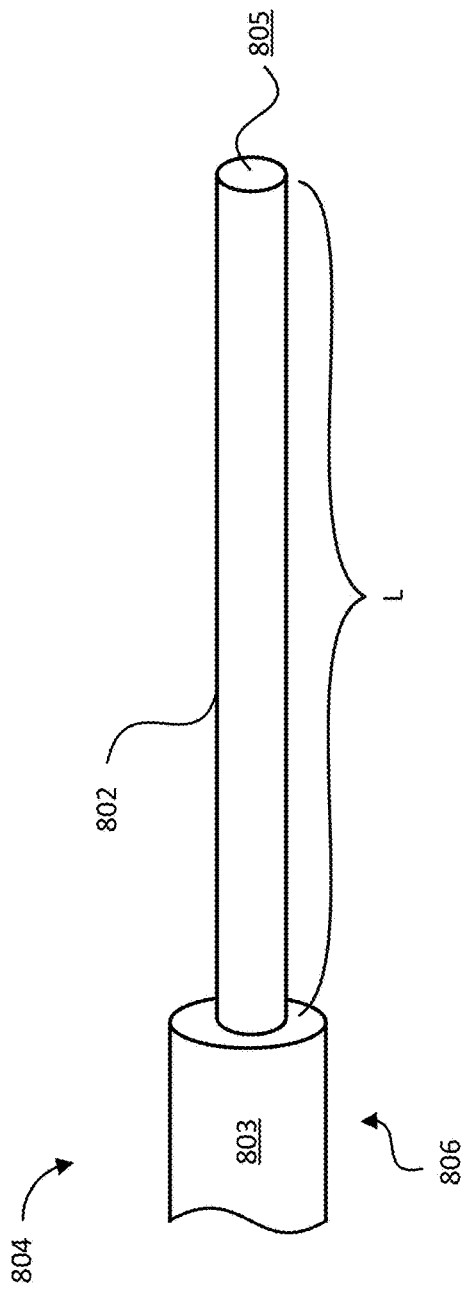
FIG. 8A
FIG. 8B

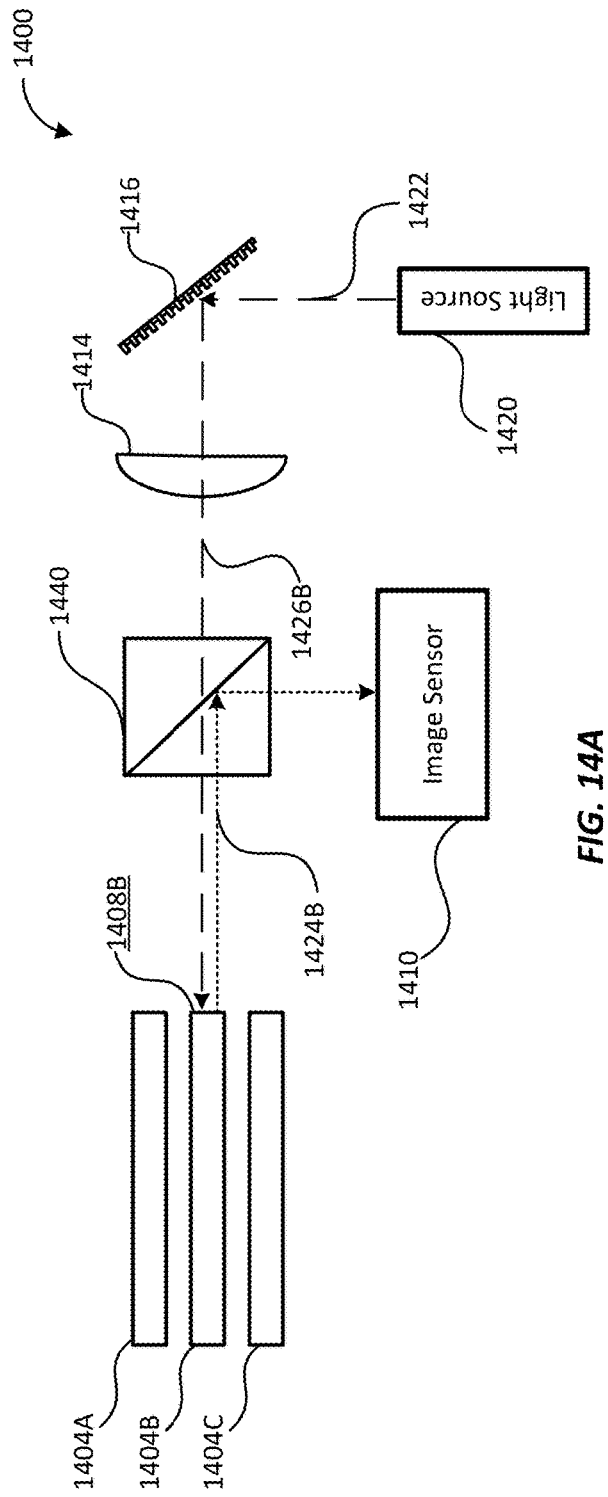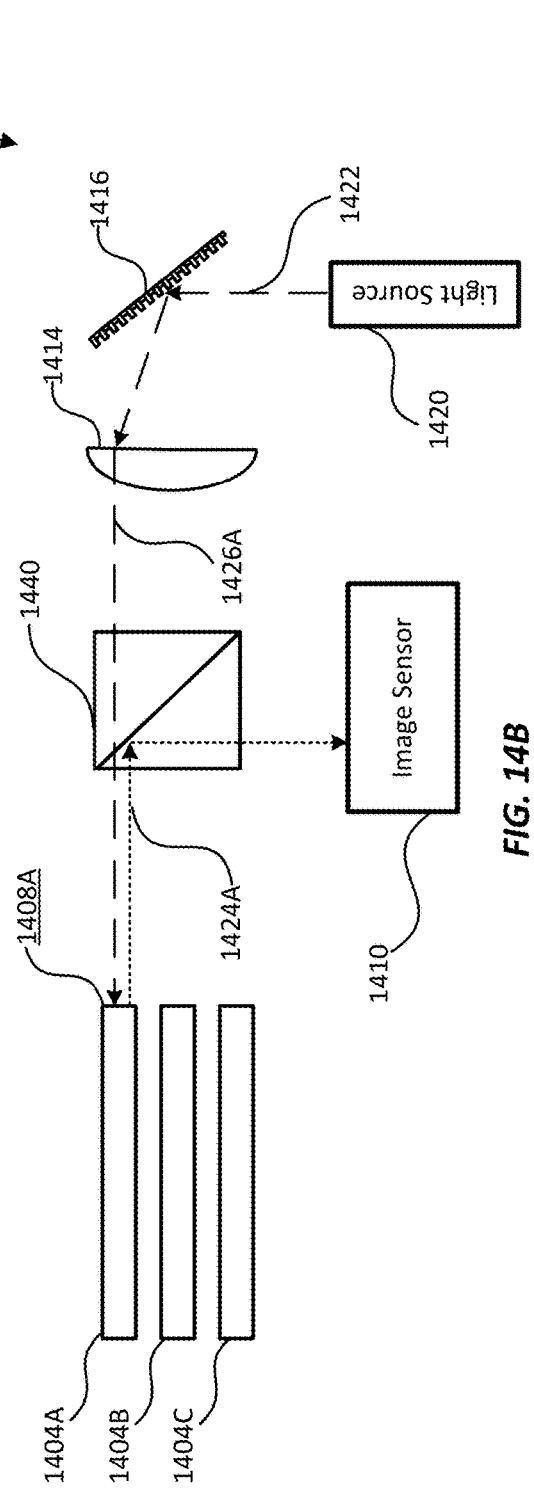

METHOD AND SYSTEM FOR ALIGNING AND POSITIONING AN OPTICAL FIBER AND MICROLENS ARRAY

CROSS-REFERENCES TO RELATED APPLICATIONS

This application claims the benefit of priority to U.S. Provisional Patent Application No. 63/323,655, filed Mar. 25, 2022, entitled "METHOD AND SYSTEM FOR ALIGNING AND POINTING AN OPTICAL FIBER AND MICROLENS ARRAY," and U.S. Provisional Patent Application No. 63/324,445, filed Mar. 28, 2022, entitled "SYSTEMS AND METHODS FOR MEASURING A CLEAVE ANGLE OF AN OPTICAL FIBER," the entire contents of which are hereby incorporated by reference for all purposes.

BACKGROUND OF THE INVENTION

When optical fibers are spliced together or bonded to optical elements, the optical fibers may be positioned and aligned for splicing and/or bonding. A microlens array is an optical element to which optical fibers are often bonded. A microlens array may include multiple lenslets. An optical fiber may be aligned and bonded to each of the multiple lenslets in a microlens array. Despite the progress made in the development of microlens array alignment systems, there is a need in the art for improved methods and systems related to alignment of an optical fiber with a microlens array.

Moreover, optical fibers have structures that support propagation of light by way of total internal reflection. When optical fibers are spliced together or bonded to optical elements, the fibers may be positioned and aligned for splicing and/or bonding. Despite the progress made in the development of cleave angle measurement systems and techniques, there is a need in the art for improved methods and systems related to measuring the cleave angle of an optical fiber.

SUMMARY OF THE INVENTION

The present disclosure relates generally to methods and systems related to optical systems including optical fibers. More particularly, embodiments of the present invention provide methods and systems that can be used to align one or more optical fibers with a microlens array as well as to measure a cleave angle of an optical fiber. The disclosure is applicable to a variety of applications in lasers and optics, including fiber laser implementations.

In aspects, a method of aligning an optical fiber is provided. The method may include providing an optical fiber having a first end and a second end, where the first end of the optical fiber has a predefined manufacturing property. For example, the predefined manufacturing property of the first end of the optical fiber may include a predefined cleave angle. The method may also include positioning the optical fiber such that the first end of the optical fiber faces a microlens array (MLA) alignment system. In an example embodiment, the MLA alignment system may include a tilt sensing device and a position sensing device. The method may also include emitting a light beam from the first end of the optical fiber toward the MLA alignment system. In some embodiments, the MLA alignment system may also include a beam splitter and a collecting lens. In such embodiments, emitting the light beam from the first end of the optical fiber may include transmitting a first portion of the light beam from the first end of the optical fiber through the beam splitter before reaching the position sensing device and reflecting a second portion of the light beam from the first end of the optical fiber off of the beam splitter and through the collecting lens before reaching the tilt sensing device.

The method may also include generating a reference output from the MLA alignment system based on the light beam. The reference output may include at least one of a tilt measurement and/or a position measurement. In some embodiments, generating the reference output from the MLA alignment system based on the light beam may include positioning the optical fiber in a first position, measuring, via the tilt sensing device, a first tilt measurement based on the light beam emitted from the first end of the optical fiber in the first position; measuring, via the position sensing device, a first position measurement based on the light beam emitted from the first end of the optical fiber in the first position; comparing the first tilt measurement to a tilt threshold; and comparing the first position measurement to a position threshold. Positioning the optical fiber in the first position may include moving the optical fiber along at least one of an x-axis, a y-axis, a z-axis, a w-rotation, a u-rotation, or a v-rotation. In such embodiments, the method may further include positioning the optical fiber in a second position, measuring, via the tilt sensing device, a second tilt measurement from the tilt sensing device based on the light beam emitted from the first end of the optical fiber; measuring, via the position sensing device, a second position measurement based on the light beam emitted from the first end of the optical fiber in the first position; comparing the second tilt measurement to the tilt threshold; and comparing the second position measurement to the position threshold.

The method may also include, after generating the reference output, providing a microlens array (MLA) having a plurality of lenslets in a first position between the first end of the optical fiber and the MLA alignment system. For example, providing the MLA in the first position between the first end of the optical fiber and the MLA alignment system may include placing the MLA in the first position such that the light beam emitting from the first end of the optical fiber transmits through a lenslet of the plurality of lenslets.

The method may also include generating a first MLA beam output for the first position of the MLA, where the first MLA beam output includes at least one of a first MLA tilt value or a first MLA position value. For example, generating the first MLA beam output for the first position of the MLA may include measuring, via the tilt sensing device, the first MLA tilt value for the MLA at the first position, measuring, via the position sensing device, the first MLA position value for the MLA at the first position, comparing the first MLA tilt value to an MLA tilt threshold, and comparing the first MLA position value to an MLA position threshold, where the alignment threshold includes the MLA tilt threshold and the MLA position threshold. In some embodiments, the example may further include moving, based on the first MLA beam output, the MLA from the first position to a second position, generating a second MLA beam output for the second position of the MLA, where generating the second MLA beam output may include measuring, via the tilt sensing device, a second MLA tilt value for the MLA at the second position; measuring, via the position sensing device, a second MLA position value for the MLA at the second position; and comparing the second MLA beam output to the alignment threshold, where comparing the second MLA beam output to the alignment threshold includes comparing the second MLA tilt value to the MLA tilt threshold; and comparing the second MLA position value to the MLA position threshold. In some embodiments, moving the MLA from the first position to the second position may include moving the MLA along at least one of an x-axis, a y-axis, a z-axis, a w-rotation, a u-rotation, or a v-rotation.

The method may also include comparing the first MLA beam output with an alignment threshold. In some embodiments, the method may further include attaching a first end of a second optical fiber to the lenslet of the plurality of lenslets of the MLA. In such embodiments, the first end of the second optical fiber may be the first end of the optical fiber.

In another aspect, a method of aligning an optical fiber array is provided. The method may include providing a plurality of optical fibers. The plurality of optical fibers may include a first optical fiber having a first end and a second end, and a second optical fiber having a third end and a fourth end. The method may also include positioning the first optical fiber such that the first end of the optical fiber faces an MLA alignment system. The MLA alignment system may include a tilt sensing device and a position sensing device. In some embodiments, the MLA alignment system may further include a beam splitter and a collecting lens. In such embodiments, the method may further include emitting a light beam from the first end of the first optical fiber. Emitting the light beam from the first end of the first optical fiber may include transmitting a first portion of the light beam from the first end of the first optical fiber through the beam splitter before reaching the position sensing device and reflecting a second portion of the light beam from the first end of the first optical fiber off of the beam splitter and through the collecting lens before reaching the tilt sensing device.

The method may also include providing a microlens array (MLA) having multiple lenslets in a first position between the first end of the first optical fiber and the MLA alignment system, where the lenslets include a first lenslet and a second lenslet. The method may also include adjusting the first end of the first optical fiber into coarse alignment with the first lenslet of the plurality of lenslets. For example, adjusting the first end of the first optical fiber into coarse alignment with the first lenslet may include positioning the first end of the first optical fiber at a predetermined distance from the surface of the first lenslet.

The method may also include generating a first MLA beam output for the first optical fiber, where the first MLA beam output includes at least one of a first MLA tilt value or a first MLA position value and comparing the first MLA beam output with an alignment threshold, where the alignment threshold includes at least one of an MLA tilt threshold or an MLA position threshold. The method may also include attaching the first end of the first optical fiber to a surface of the first lenslet and moving the MLA to a second position between the third end of the second optical fiber and the MLA alignment system such that the third end of the second optical fiber is in coarse alignment with the second lenslet. For example, moving the first optical fiber to a second position may include moving the first optical fiber along an x-axis, a y-axis, a z-axis, a w-rotation, a u-rotation, or a v-rotation to a second position.

In some embodiments, the method may further include generating the first MLA beam output for the first optical fiber and comparing the first MLA beam output with an alignment threshold. For example, generating the first MLA beam output for the first optical fiber may include measuring, via the tilt sensing device, the first MLA tilt value, and measuring, via the position sensing device, the first MLA position value. Comparing the first MLA beam output with an alignment threshold may include comparing the first MLA tilt value to an MLA tilt threshold and comparing the first MLA position value to an MLA position threshold, where the alignment threshold includes the MLA tilt threshold and the MLA position threshold.

In some embodiments, the method may further include moving, based on the first MLA beam output, the first optical fiber to a second position, generating a second MLA beam output for the first optical fiber in the second position. Generating the second MLA beam output may include measuring, via the tilt sensing device, a second MLA tilt value from the tilt sensing device and measuring, via the position sensing device, a second MLA position value. In such embodiments, the method may also include comparing the second MLA beam output to the alignment threshold, where comparing the second MLA beam output to the alignment threshold includes comparing the second MLA tilt value to the MLA tilt threshold and comparing the second MLA position value to the MLA position threshold.

In some embodiments, the multiple optical fibers may further include a third optical fiber having a fifth end and a sixth end and the plurality of lenslets include a third lenslet. In such embodiments, the method may further include attaching the third end of the second optical fiber to a surface of the second lenslet and moving the MLA to a third position between the fifth end of the third optical fiber and the MLA alignment system such that the fifth end of the third optical fiber is in coarse alignment with the third lenslet.

Systems and methods for measuring a cleave angle of an optical fiber using a cleave angle measurement system are provided herein. In an aspect, a method of measuring a cleave angle of an optical fiber is provided. The method may include providing a cleave angle measurement system. The cleave angle measurement system may include an optical fiber channel, an image sensor, and a light source. The method may include placing an optical fiber into the optical fiber channel. The optical fiber may include a cleaved end and may be positioned such that the cleaved end is in optical alignment with the light source. In some embodiments, the cleave angle measurement system may also include a beam splitter. In such embodiments, the method may also include transmitting light from the light source through the beam splitter, reflecting light off of the cleaved end of the optical fiber, and reflecting, by the beam splitter, the light reflected off of the cleaved end of the optical fiber to the image sensor. In still other embodiments, the cleave angle measurement system may also include a beam collector. In such embodiments, the method may also include collecting, by the beam collector, stray light generated by the light reflecting off of the cleaved end of the optical fiber.

In some embodiments, the method may also include, prior to placing the optical fiber in the optical fiber channel, removing a coating from the cleaved end of the optical fiber to expose an inner portion of the optical fiber. For example, a longitudinal length, L, of the inner portion of the optical fiber that is exposed may be between 5 to 20 mm. In such embodiments, the method may further include securing the inner portion of the optical fiber in the optical fiber channel.

The method may also include determining an optical center of an image sensor. The optical center of an image sensor may be determined by a variety of techniques as described herein. For example, in some embodiments, determining an optical center of the image sensor may include generating, based on the light detected by the image sensor, a first emission face measurement for the cleaved end of the optical fiber in a first position, computing a first optical centroid of the first emission face measurement, determining a first radial distance for the first emission face measurement of the optical fiber, and computing, based on the first radial distance, the cleave angle for the cleaved end of the optical fiber. After determining the first optical centroid for the first emission face measurement in the first position rotating the optical fiber to a second position. Then, based on light reflected off of the cleaved end of the optical fiber, a second emission face measurement for the optical fiber in the second position may be generated and a second optical centroid of the second emission face measurement may be computed. In some embodiments, the optical fiber may be further rotated to a third position, and, based on light reflected off of the cleaved end of the optical fiber, a third emission face measurement for the optical fiber in the third position may be generated, and a third optical centroid of the third emission face measurement may be generated therefrom. The optical center of the image sensor may be determined based on the first optical centroid, the second optical centroid, and the third optical centroid.

In other embodiments, the optical center of the image sensor may be determined by a calibration technique. In such an embodiment, the method may include placing a calibration optical fiber in a first position in the optical fiber channel, where the calibration optical fiber comprises a cleaved end with a known cleave angle. The image sensor may detect light reflected off of the cleaved end of the calibration optical fiber and a first emission face measurement for the calibration optical fiber in the first position may be generated based on the light detected by the image sensor. Then the calibration optical fiber may be rotated to a second position. In the second position, a second emission face measurement may be generated for the calibration optical fiber in the second position based on light reflected off of the cleaved end of the calibration optical fiber. The optical center of the image sensor may be determined based on the first emission face measurement and the second emission face measurement.

The method may also include reflecting light transmitted by the light source off of the cleaved end of the optical fiber and detecting, by the image sensor, light reflected off of the cleaved end of the optical fiber.

In some embodiments, the method may include determining whether another emission face measurement is to be performed. To determine whether another emission face measurement is to be performed, an emission face measurement may be generated and a determination may be made whether the emission face measurement is valid. For example, the method may include generating, based on the light detected by the image sensor, a first emission face measurement for the cleaved end of the optical fiber in a first position, computing a first optical centroid of the first emission face measurement, and determining a first radial distance for the first emission face measurement of the optical fiber.

In some embodiments, the determination may be made that another emission face measurement is to be performed. In such embodiments, the method may include rotating the optical fiber to the second position and then generating, based on light reflected off of the cleaved end of the optical fiber, a second emission face measurement for the optical fiber in the second position. A second optical centroid of the second emission face measurement may be computed and a determination may be made whether the first emission face measurement or the second emission face measurement are valid Determining whether the first emission face measurement or the second emission face measurement are valid may include determining a circular radius based on the optical center, determining a second radial distance for the second emission face measurement based on the circular radius, and determining whether the second radial distance and the first radial distance align at the optical center. In other embodiments, determining whether the first emission face measurement or the second emission face measurement are valid may include determining whether the first emission face measurement is within a threshold, and determining whether the second emission face measurement is within the threshold.

In other embodiments, the determination, based on the first radial distance and the first centroid, may be made that no other emission face measurement is to be performed. In such embodiments, the method may include computing, based on the first radial distance, the cleave angle for the cleaved end of the optical fiber. As noted above, the cleave angle measurement system provides for accurate cleave angle measurements with precision down to a 0.5 degree or less angle measurement.

In other aspects, a method of measuring a cleave angle of a plurality of optical fibers using a cleave angle measurement system is provided. The method may include providing a cleave angle measurement system. The cleave angle measurement system may include a first optical fiber channel, a second optical fiber channel, an image sensor, and a light source. In some embodiments, the multiple optical fibers may be part of an optical fiber array. Each of the optical fibers may include a cleaved end. For example, the first optical fiber may include a first cleaved end and the second optical fiber may include a second cleaved end. The first cleaved end and the second cleaved end may be positioned toward the light source.

In some embodiments, the method may also include, prior to placing the first optical fiber in the first optical fiber channel, removing a coating from the first cleaved end of the first optical fiber to expose an inner portion of the first optical fiber. A coating may also be removed from the second cleaved end of the second optical fiber to expose an inner portion of the second optical fiber. For example, a longitudinal length, L, of the inner portion of the first optical fiber and the second optical fiber that is exposed may be between 5 to 20 mm. In such embodiments, the method may further include securing the first optical fiber and the second optical fiber by the respective inner portions.

In some embodiments, the cleave angle measurement system may also include a beam splitter. In such embodiments, the method may also include transmitting the first wavelength and the second wavelength from the light source through the beam splitter, reflecting the first wavelength off of the first cleaved end, reflecting the second wavelength off of the second cleaved end, and reflecting, by the beam splitter, the first wavelength reflected off of the first cleaved end and the second wavelength reflected off of the second cleaved end to the image sensor.

In still other embodiments, the cleave angle measurement system may also include a grating. In such embodiments, the grating may be positioned to direct the first wavelength from the light source to the first cleaved end of the first optical fiber and direct the second wavelength from the light source to the second cleaved end of the second optical fiber.

In such embodiments, the method may include transmitting a light beam from the light source, where the light beam includes the first wavelength and the second wavelength. For example, the method may include diffracting, by the grating, the light beam such that the lens selectively positions the first wavelength from the light beam to transmit onto the first cleaved end, and diffracting, by the grating, the light beam such that the lens selectively positions the second wavelength from the light beam to transmit onto the second cleaved end.

The method may include determining an optical center for the image sensor. For example, the optical center for the image sensor may be determined by any of the methods or techniques described herein. The method may also include reflecting a first wavelength transmitted by the light source off of the first cleaved end of the first optical fiber. Then the method may include determining, based on the first wavelength reflected off of the first cleaved end, a first cleave angle for the first cleaved end. For example, determining the first cleave angle for the first cleaved end may include detecting, by the image sensor, the first wavelength reflected off of the first cleaved end of the first optical fiber; generating, based on the first wavelength detected by the image sensor, a first emission face measurement for the first cleaved end of the first optical fiber in a first position; computing a first optical centroid of the first emission face measurement; determining a first radial distance for the first emission face measurement of the first optical fiber; and computing, based on the first radial distance, the first cleave angle. The first radial distance for the first emission face measurement may be based on the optical center of the image sensor.

The method may also include reflecting the second wavelength transmitted by the light source off of the second cleaved end of the second optical fiber. Then the method may include determining, based on the second wavelength reflected off of the second cleaved end, a second cleave angle for the second cleaved end. In example embodiments, the first wavelength may be different from the second wavelength.

BRIEF DESCRIPTION OF THE DRAWINGS

FIG. 8A is a simplified schematic diagram of a cleave angle measurement system according to an embodiment of the present invention.

FIG. 8B illustrates a side view of an optical fiber as provided in the cleave angle measurement system illustrated by FIG. 8A.

FIGS. 14A-B are schematic diagrams illustrating a cleave angle measurement system according to an embodiment of the present invention.

DETAILED DESCRIPTION OF SPECIFIC EMBODIMENTS

The present disclosure relates generally to methods and systems related to optical systems including optical fibers. More particularly, embodiments of the present invention provide methods and systems that can be used for aligning and bonding an optical fiber with an MLA. Additionally, embodiments of the present invention provide methods and systems that can be used for determining a cleave angle of an optical fiber. The disclosure is applicable to a variety of applications in lasers and optics, including fiber laser implementations.

An optical fiber can be bonded to a microlens. In some cases, a microlens may be part of a microlens array (MLA). Often, a microlens, also referred to as a lenslet, may be sized to have a diameter approximately equal to an outer diameter of an optical fiber. As such, the alignment tolerances for aligning an optical fiber with an MLA are tight and alignment of the optical fiber to the lenslet can be difficult. For example, an alignment tolerance may be ±1.0 microns and ±0.5 mdeg. As the diameter of a lenslet is approximately equal to an outer diameter of an optical fiber, alignment of the optical fiber with a lenslet can be difficult.

In addition to the tight alignment tolerances, alignment of an optical fiber with an MLA may also need to compensate for variations in manufacturing characteristics or properties of the optical fiber. For example, each optical fiber may have variations in cleave angle and centration of the optical fiber's core. To compensate for manufacturing characteristics of an optical fiber and meet the tight alignment tolerances, an MLA alignment system is provided herein.

Figure 1:
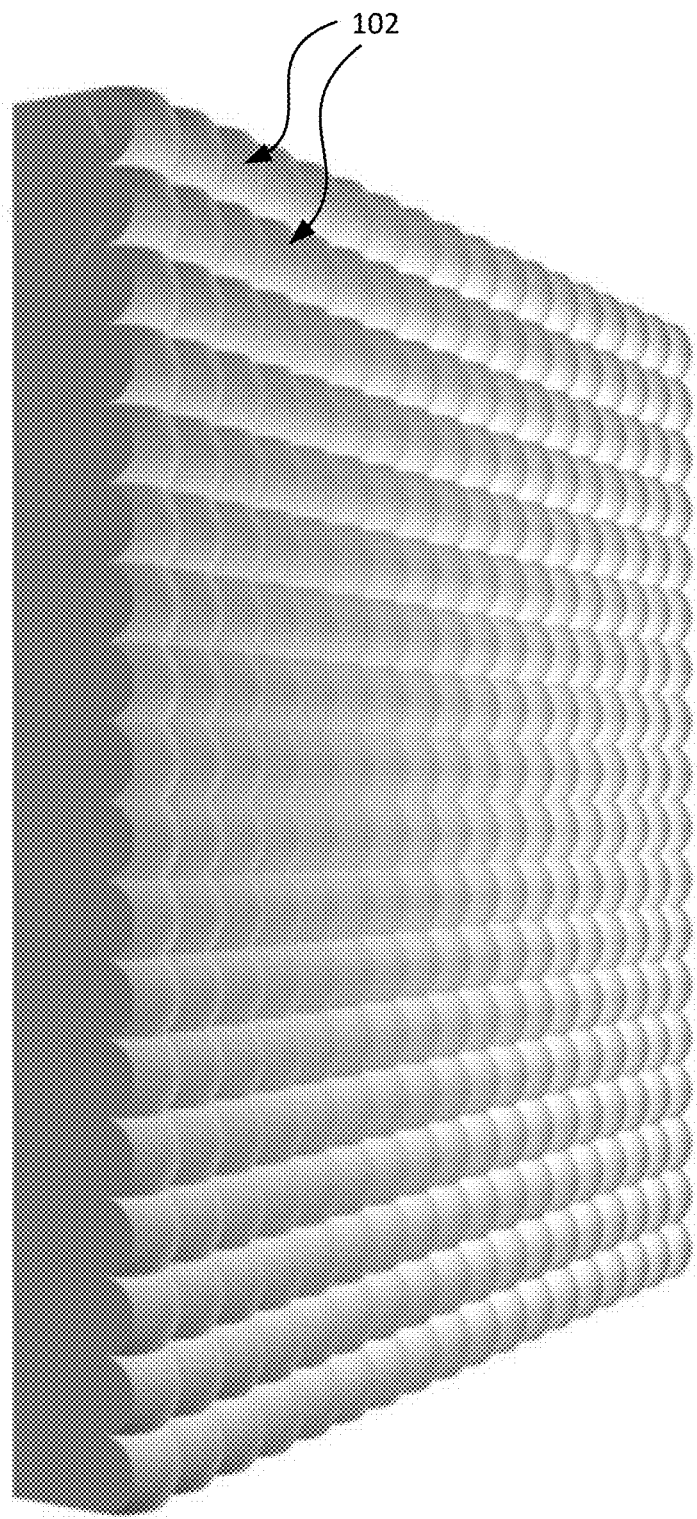
FIG. 1 is a simplified schematic diagram of a microlens array (MLA) according to an embodiment of the present invention.

FIG. 1 is a simplified schematic diagram of an MLA 100 according to an embodiment of the present invention. As shown, the MLA 100 may include multiple lenslets 102. Each lenslet 102 may be a microlens. A microlens may be a small lens, generally with a diameter less than a millimeter (mm) and as small as 10 microns (μm). Each of the lenslets 102 may be a single microlens with one planar surface and one convex (e.g., spherical) surface to refract the light. In some cases, the lenslets 102 may be or include several layers of optical material to achieve desired optical properties. In some embodiments, the MLA 100 may be formed by a one-dimensional or two-dimensional array of the lenslets 102 on a supporting substrate. The lenslets 102 may serve to focus and concentrate light from one or more optical fibers.

Figure 2:
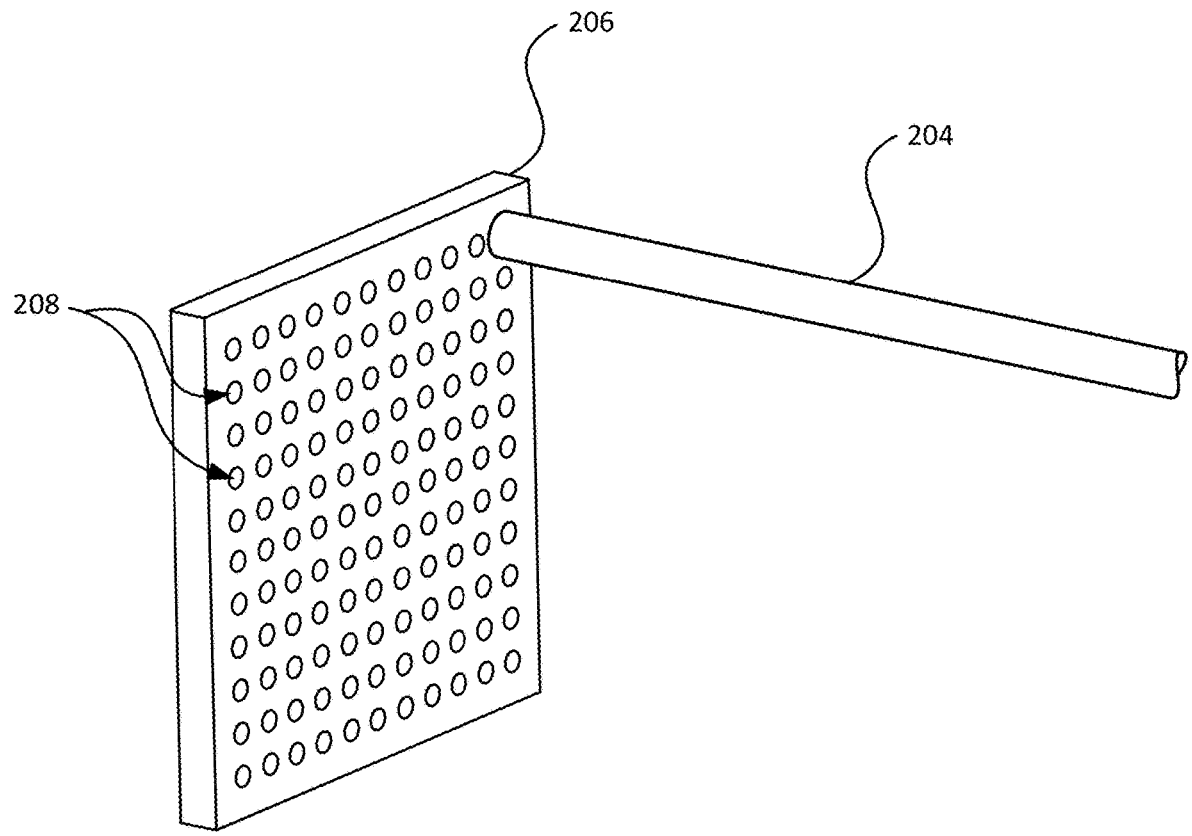
FIG. 2 is a simplified schematic diagram of aligning an optical fiber with a lenslet in an MLA.

Turning now to FIG. 2, a simplified schematic diagram 200 of a conventional alignment process for aligning an optical fiber 204 with a lenslet of an MLA is provided. Conventional approaches often involve an orifice plate 206 having multiple orifices 208. In some embodiments, an MLA may be part of the orifice plate 206. In other embodiments, the orifice plate 206 may be aligned with an MLA such that each of the orifices 208 align with a lenslet of the MLA. In an example, the orifices 208 may be manufactured with lithography techniques.

To align the optical fiber 204 with a lenslet under a conventional approach, the optical fiber 204 may be inserted into one of the orifices 208. Since the orifice is aligned with a lenslet, inserting the optical fiber 204 into one of the orifices 208 is used to align the optical fiber 204 with the lenslet. The use of the orifice plate 206 for alignment, however, can provide for various deficiencies in the alignment process. For example, the orifice plate 206 does not allow for independent fiber alignment, nor does it allow for correction of fiber manufacturing imperfections, nor does it allow for alignment of the tip and tilt of the optical fiber 204. And while decreasing the diameter of the orifices may improve alignment tolerances, decreasing the diameter of the orifice often lends to damage of the optical fiber or failure during the insertion process.

Figure 3A:
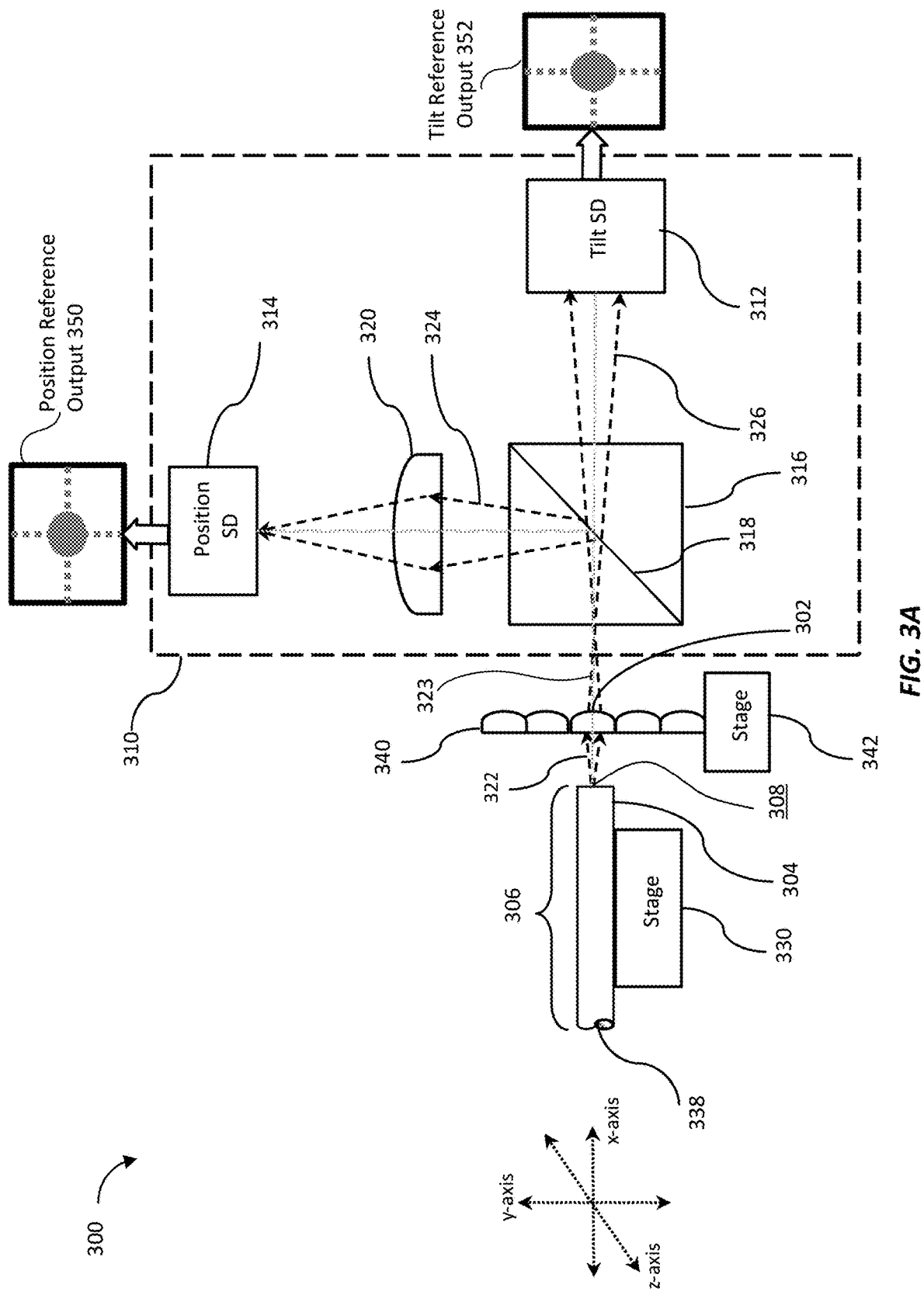
FIG. 3A is a simplified schematic diagram of an MLA alignment system according to an embodiment of the present invention when an optical fiber is located at the nominal position.

To provide for independent and active optical fiber alignment with an MLA, an MLA alignment system is provided herein. FIG. 3A provides a simplified schematic diagram of a system 300 for performing an MLA alignment according to an embodiment of the present invention when an optical fiber is located at the nominal position. The system 300 may be used to align one or more optical fibers, such as optical fiber 304, with an MLA, such as MLA 340. Specifically, the system may include an MLA alignment system 310 for positioning and aligning the optical fiber 304 with a lenslet 302 of the MLA 340. As shown, MLA 340 may include multiple lenslets and the MLA alignment system 310 may be used to position and align multiple optical fibers with the multiple lenslets of the MLA.

The optical fiber 304 may be a polarization maintaining fiber having one or more stress rods, a patterned microstructure, or one or more cores. In some embodiments, the optical fiber 304 may be or include a bow-tie fiber, a panda fiber, a multi-core fiber, an elliptical fiber, a photonic crystal optical fiber, or the like. Advantageously, the system 300 may be agnostic to the optical polarization state of the optical fiber 304. As such, in other embodiments, the optical fiber 304 may be a single mode fiber, a multi-mode fiber, or any other type of optical fiber. The optical fiber 304 may have a diameter that is less than 250 μm. For example, the optical fiber 304 may have a diameter that is less than 225 μm, less than 200 μm, less than 175 μm, less than 850 μm, less than 125 μm, or less than 100 μm.

As noted above, the optical fiber 304 may have individual manufacturing characteristics or properties. For example, the optical fiber 304 may have a cleaved end 308 with a different cleave angle from another optical fiber. The cleaved end 308 of the optical fiber 304 may be an end of the optical fiber having a cleave or cut that is substantially perpendicular to the longitudinal length 306 of the optical fiber 304 made during the manufacturing process.

Other manufacturing properties of the optical fiber 304 may include a bend or curvature of the optical fiber 304 along the longitudinal length 306 of the optical fiber 304. During or after the manufacturing process, the optical fiber 304 may be wound or rolled into a bundle, which can result in a bend or curvature of the optical fiber 304 along the longitudinal length 306. Additional manufacturing characteristics of the optical fiber 304 may include the material of the optical fiber 304 and whether the optical fiber 304 includes a jacket or coating. An additional manufacturing characteristic of the optical fiber 304 may include the centration of the optical core with respect to the outer fiber cylinder diameter. Centration errors of the optical core can result in an optical axis that is different from the mechanical axis of the optical fiber.

The manufacturing characteristics of the optical fiber 304 may impact the orientation and/or offset of light emitted from the optical fiber 304. For example, if the cleaved end 308 of the optical fiber 304 has a non-zero cleave angle (a zero cleave angle being a perfectly perpendicular cleave to the longitudinal length 306 of the optical fiber 304), then light emitted from the cleaved end 308 of the optical fiber 304 may be offset by an angle proportional to the non-zero cleave angle. Any offset of light emitted from the cleaved end 308 may impact the performance of the optical fiber 304.

The positioning and alignment of the cleaved end 308 with the lenslet 302 may also affect the characteristics of light emitted from the optical fiber 304. As noted above, the optical fiber 304 may be positioned and aligned with the lenslet 302. Specifically, the cleaved end 308 of the optical fiber 304 may be aligned with the lenslet 302 such that light beams 322 transmit through the lenslet 302 and generate refracted light beams 323. The refracted light beams 323 may be formed by refraction of the light beams 322 through the lenslet 302.

During the assembly of the fiber and MLA system, the cleaved end 308 of the optical fiber 304 is aligned with the lenslet 302. Alignment of the cleaved end 308 of the optical fiber with the lenslet 302 as used herein may mean that the optical fiber 304 is positioned such that the refracted light beams 323, as propagated through the lenslet 302, are maximized so as to maintain the intensity of the light beams 322. In some embodiments, the MLA 340 may be positioned at a predetermined distance from the optical fiber 304. Specifically, the MLA 340 may be positioned such that the lenslet 302 is at a predetermined distance from the cleaved end 308 of the optical fiber 304. For example, the predetermined distance may be less than 10 μm, less than 100 μm, less than 500 μm, or less than 1 mm. In other embodiments, the MLA 340 may be positioned such that the lenslet 302 is in contact or near contact with the cleaved end 308 of the optical fiber 304.

The MLA alignment system 310 can be used to align the optical fiber 304 with the lenslet 302. To provide for precise alignment between the cleaved end 308 and the lenslet 302, and, advantageously, compensate for any manufacturing characteristics of the individual optical fiber, the MLA alignment system 310 may include one or more position sensing devices. For example, as illustrated in FIG. 3A, the MLA alignment system 310 may include a tilt sensing device 312 and a position sensing device 314. The tilt sensing device 312 and/or the position sensing device 314 may be or include a camera, quadrant photodiode, or other instrument capable of sensing an output position of the optical fiber 304.

The tilt sensing device 312 may be configured and positioned to sense the tilt of the optical fiber 304. The tilt of the optical fiber 304 may be or include the orientation and position of the cleaved end 308 with respect to the longitudinal length 306 of the optical fiber 304. For example, if the cleaved end 308 of the optical fiber 304 is higher on the y-axis than other portions of the optical fiber 304, as measured along the longitudinal length 306 of the optical fiber 304, then the optical fiber 304 may be tilted. Tilting of the optical fiber 304 may be caused by a curvature or bend in the optical fiber 304.

The position sensing device 314 may be configured and positioned to sense the latitudinal (z-axis) and longitudinal (y-axis) position of the optical fiber 304. To align the cleaved end 308 with the lenslet 302, the cleaved end 308 may need to be positioned at specific x-y-z coordinates. Additionally, to maximize the intensity of the refracted light beams 323 refracted through the lenslet 302, the cleaved end 308 may need to be positioned at specific x-y-z coordinates. The position sensing device 314 may sense and provide an output reading of the x-y-z coordinates of the optical fiber 304.

To direct the refracted light beams 323 to both the tilt sensing device 312 and the position sensing device 314, the MLA alignment system 310 may include a beam splitter 316. The beam splitter 316 may be positioned in axial alignment with the optical fiber 304 and the MLA 340. The beam splitter 316 may be positioned between the MLA 340 and the tilt sensing device 312 along the x-axis. The beam splitter 316 may also be positioned to produce reflected light beams 324 to the position sensing device 314. For example, the beam splitter 316 may include a surface 318 that reflects a portion of the refracted light beams 323 towards the position sensing device 314 as reflected light beams 324. The surface 318 may be a reflective surface such as a mirror. As shown, the beam splitter 316 may reflect a portion of the light beams 322 toward the position sensing device 314 while transmitting the remaining portion of the refracted light beams 323 as transmitted light beams 326 to the tilt sensing device 312. Although the position sensing device 314 is illustrated as receiving light reflected from beam splitter 316, this is not required by embodiments of the present invention and, in other embodiments, the position sensing device 314 may be switched with the tilt sensing device 312 so that the tilt sensing device 312 receives light reflected from beam splitter 316. One of ordinary skill in the art would recognize many variations, modifications, and alternatives.

In some embodiments, the MLA alignment system 310 may include a collecting lens 320. The collecting lens 320 may be positioned between the beam splitter 316 and the position sensing device 314. The reflected light beams 324 may be received by the collecting lens 320 and directed to the position sensing device 314. A focal length of the collecting lens 320 and the distance from the beam splitter 316 to the collecting lens 320 may be determined based on a given wavelength of the light beams 322 and the properties of the MLA 340.

To position and align the optical fiber 304, the MLA alignment system 310 may generate a reference output for the optical fiber 304. The position sensing device 314 may generate a position reference output 350 and the tilt sensing device 312 may generate a tilt reference output 352. Although the position reference output 350 and the tilt reference output 352 are illustrated as part of system 300, it should be understood that the position reference output 350 and the tilt reference output 352 are not physical components of the system 300. Rather, the position reference output 350 and the tilt reference output 352 are provided to illustrate a measurement or output provided by the respective sensing device. The position reference output 350 and the tilt reference output 352 are described in greater detail with reference to FIGS. 4A and 4B.

In the illustrated embodiment, the position reference output 350 and the tilt reference output 352 are images of the collected beams incident on the position sensing device 314 and tilt sensing device 312, respectively. In other embodiments, the position reference output 350 and the tilt reference output 352 may be one or more analog or digital signals collected by a quadrant photodiode or similar positioning tool. One of ordinary skill in the art would recognize many variations, modifications, and alternatives to this design.

To generate the position reference output 350 and the tilt reference output 352 for the optical fiber 304, the position sensing device 314 and the tilt sensing device 312 may measure the optical fiber's position and tilt, respectively. Based on a tilt measurement and a position measurement, taken by the tilt sensing device 312 and the position sensing device 314, respectively, the MLA alignment system 310 may determine whether to adjust or modify the position and/or orientation of the optical fiber 304. For example, the MLA alignment system 310 may determine that the optical fiber 304 may need to be moved along the x-axis, e.g., to adjust the focal point of light beams 322, based on the position measurement.

To adjust or modify the position of the optical fiber 304, the system 300 may include a stage 330. In some embodiments, the stage 330 may be part of the MLA alignment system 310. In other embodiments, the stage 330 may be separate from the MLA alignment system 310. The stage 330 may be configured to hold and adjust the position of the optical fiber 304. For example, the stage 330 may move the optical fiber along the x-axis, along the y-axis, or along the z-axis. In some embodiments, the stage 330 may be configured to adjust the tilt of the optical fiber 304 by rotating the optical fiber 304. For example, the stage 330 may be or include a rotational stage that is configured to rotate the optical fiber 304. The rotational stage may rotate the optical fiber 304 about the x-axis, also known as u-rotation; about the y-axis, also known as v-rotation; or about the z-axis, also known as w-rotation. Tilt, as used herein, may include v-rotation or w-rotation of the optical fiber 304. As used herein, moving or adjusting the position of the optical fiber 304 may be understood to move the optical fiber 304 along one or more of the x-axis, y-axis, and/or z-axis, or rotating the optical fiber 304 along one or more of a u-rotation, v-rotation, or w-rotation.

Figure 3B:
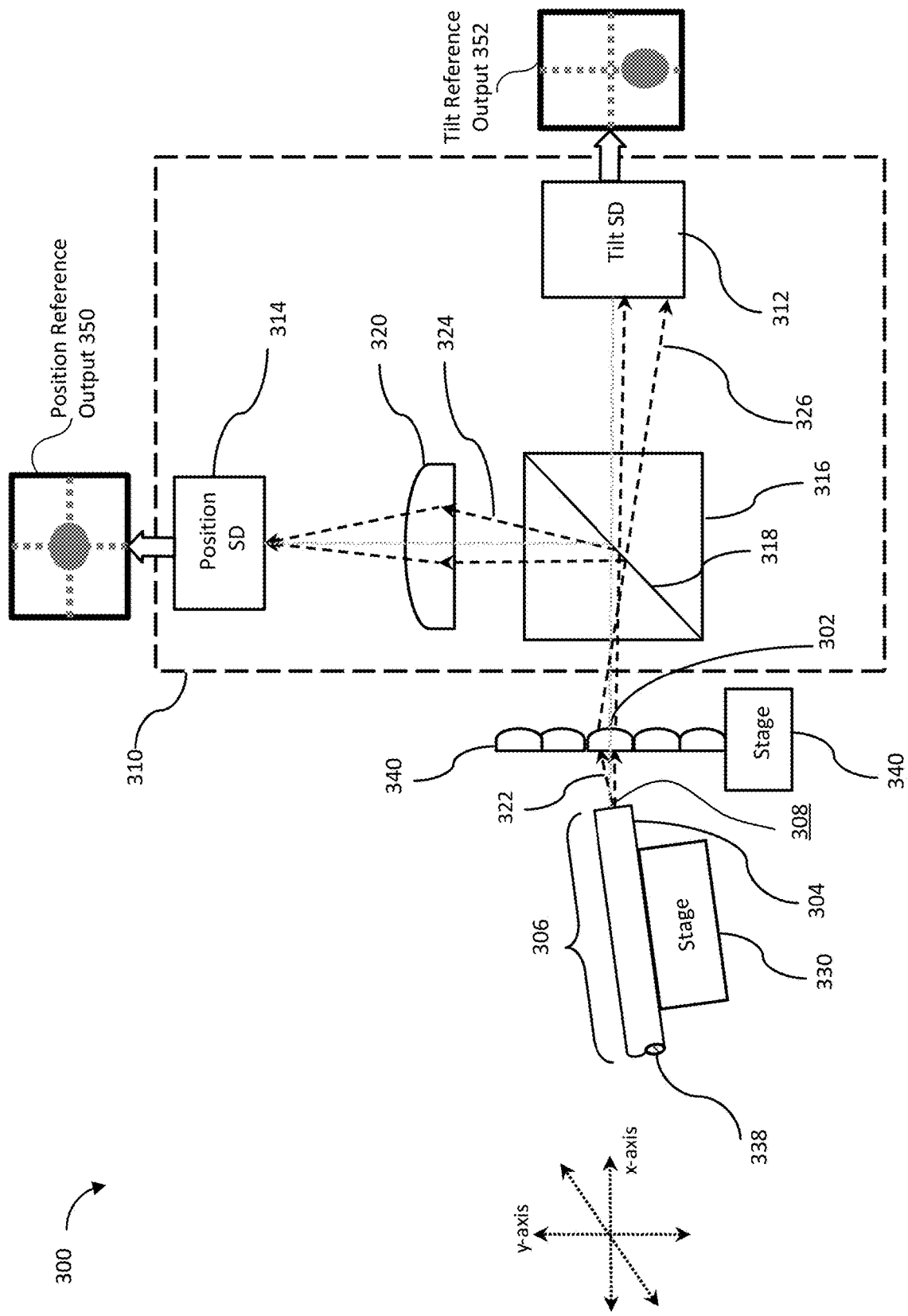
FIG. 3B is a simplified schematic diagram of an MLA alignment system according to an embodiment of the present invention when the optical fiber is in rotational misalignment.

FIG. 3B provides a simplified schematic diagram of a system 300 for performing an MLA alignment according to an embodiment of the present invention when the optical fiber 304 is in rotational misalignment. For example, FIG. 3B may illustrate the MLA alignment system 310 when the optical fiber 304 is displaced in the positive v-direction due to a rotation about the z-axis. The light beams 322 and the transmitted light beams 326 are also tilted by the same displacement in the v-direction leading to a change in the tilt reference output 352 as measured by the tilt sensing device 312. The reflected light beams 324 are also tilted by this same angle until they reach the collecting lens 320. The collecting lens 320 is selected such that the position reference output 350 of the position sensing device 314 remains unchanged for any displacements in the v-direction or w-direction.

Figure 3C:
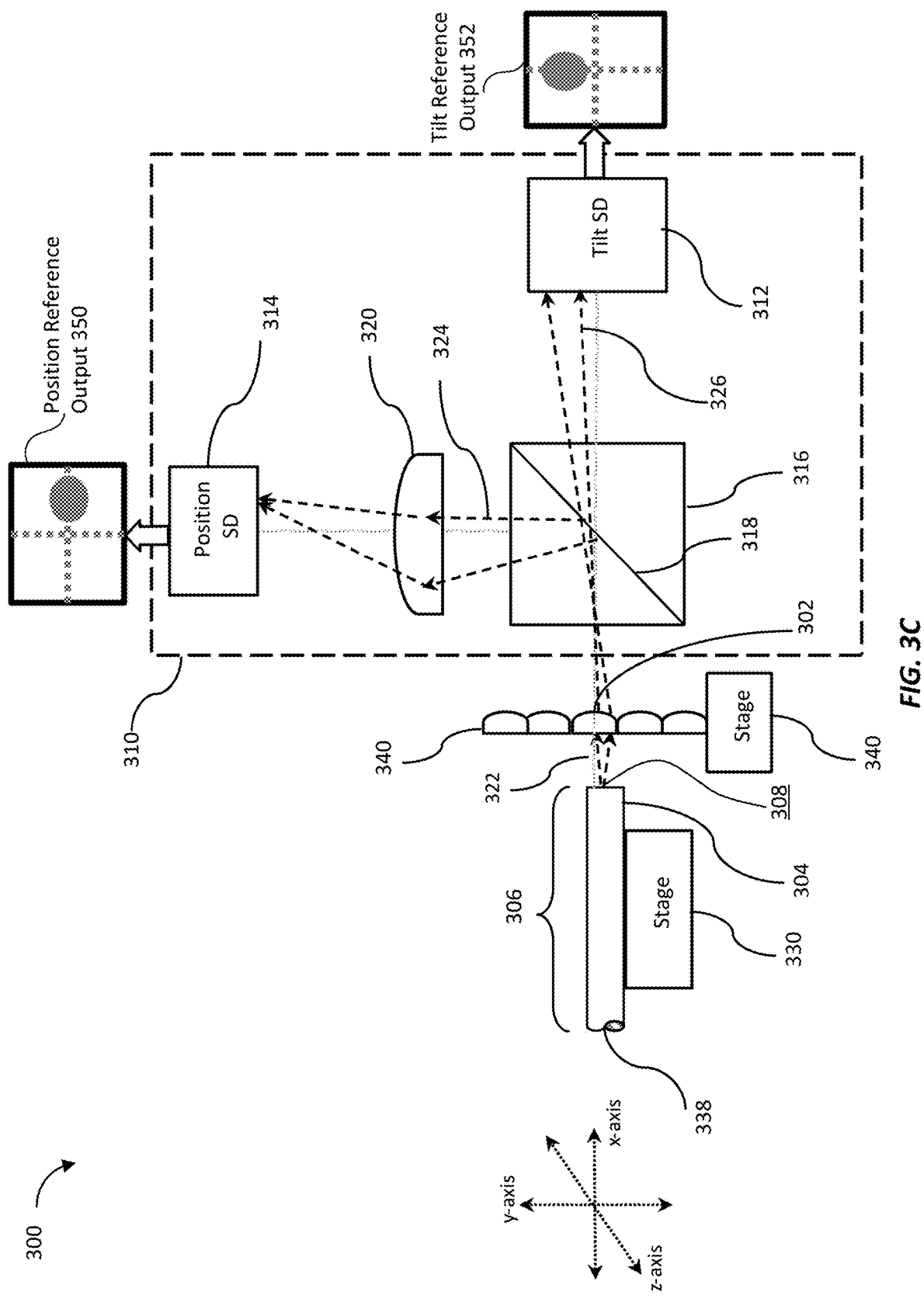
FIG. 3C is a simplified schematic diagram of an MLA alignment system according to an embodiment of the present invention when the optical fiber is in translational misalignment.

FIG. 3C provides a simplified schematic diagram of a system 300 for performing an MLA alignment according to an embodiment of the present invention when the optical fiber 304 is in translational misalignment. For example, FIG. 3C shows the MLA alignment system 310 when the optical fiber 304 is displaced in the negative y-direction. The refracted light beams 323 and the transmitted light beams 326 from the lenslet 302 are also displaced the same amount in the y-direction leading to a positive change in the tilt reference output 352 as measured by the tilt sensing device 312. The reflected light beams 324 are also displaced resulting in a negative change in the position reference output 350 as measured by the position sensing device 314.

After adjusting or modifying the position of the optical fiber 304, the MLA alignment system 310 may gather one or more measurements to determine if the position of the optical fiber 304 is within a positional tolerance. If the optical fiber 304 is within a positional tolerance, then a tilt measurement and a position measurement for the position of the optical fiber 304 may be measured. The tilt sensing device 312 may measure the tilt measurement and the position sensing device 314 may measure the position measurement.

Figure 4A:
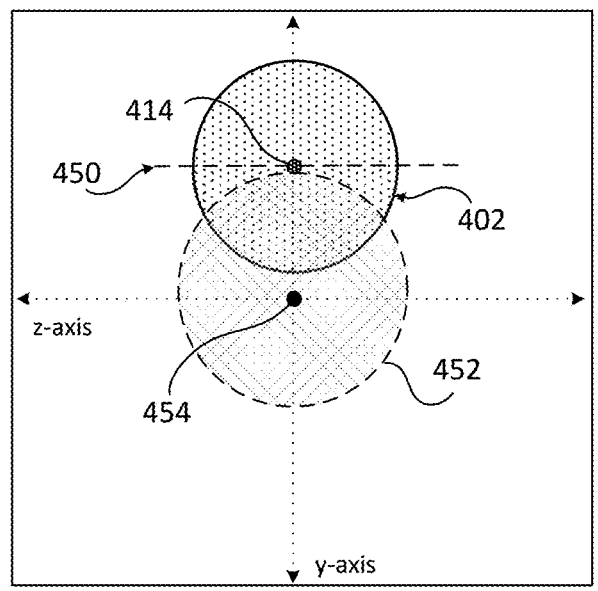
FIG. 4A is a diagram illustrating an illumination by an emission spot used to calculate a tilt measurement according to an embodiment of the present invention.
Figure 4B:
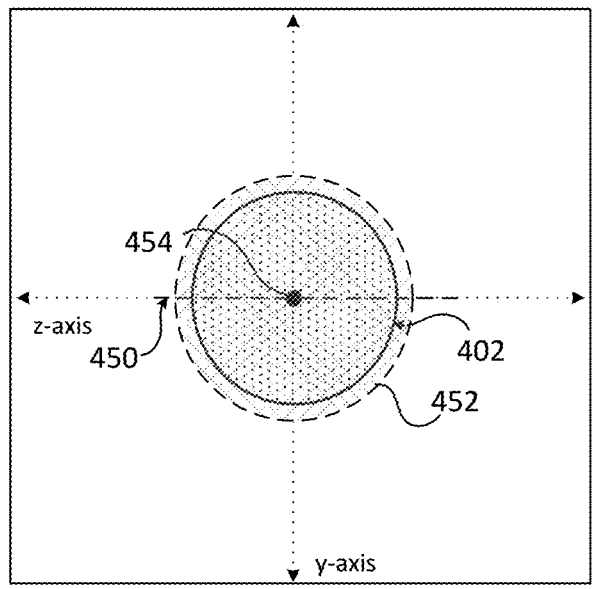
FIG. 4B is a diagram illustrating an illumination by the emission spot positioned such that the tilt measurement is within the tilt threshold according to an embodiment of the present invention.

FIG. 4A provides a diagram illustrating a diagram 400A of an emission spot 402 used to calculate a tilt measurement. The diagram 400A may be used to generate the tilt reference output 352. Although the following discussion is with respect to a tilt measurement, the position measurement may be gathered and corrected to generate a corrected reference output using one or more of the following techniques or steps. For ease of discussion, FIGS. 4A and 4B are discussed with reference to FIGS. 3A-C; however, it should be understood any systems provided herein may be used.

The emission spot 402 may be generated from a light beam incident on and captured by the tilt sensing device 312. In the case of a position measurement, the position sensing device 314 may capture a light beam incident on the position sensing device and used to generate the emission spot 402. The emission spot 402 may correspond to the cleaved end 308 of the optical fiber 304. One of several image processing methods can be utilized to detect and/or identify the various components of the optical fiber. For example, in one embodiment, z,y-coordinates of the centroid 414 of the emission spot 402 can be determined by use of an intensity weighted centroid calculation. In an alternate embodiment, the z,y-coordinates may be determined from a computational fitting algorithm of an ideal spot to the measured emission spot 402. Alternate computational variations will be evident to one skilled in the art.

The light beam used to generate the diagram 400A may be captured by receiving the reflected light beams 324 and the transmitted light beams 326. It should be understood that allowing the beam spot to expand may increase the sensitivity of the measurements gathered by the tilt sensing device 312 and/or the position sensing device 314, but the overall beam spot may be limited by the physical size of the tilt sensing device 312 and/or the position sensing device 314.

A degree of tilt may be calculated for the emission spot 402. The degree of tilt may correspond to the tilt measurement for the optical fiber 304. To calculate the degree of tilt, a tilt offset 450 may be determined for the emission spot 402. For example, in some embodiments, the degree of tilt may be determined by the centroid 414 of emission spot 402. The difference between the z-y coordinates identified by the tilt offset 450 and an origin 454 (e.g., z-y coordinates of 0,0) may be used to determine the degree of tilt (e.g., the tilt measurement) for the optical fiber 304. The tilt measurement may be determined based on the degree of tilt of emission spot 402.

For a position measurement, similar techniques may be utilized. For example, based on the light beam captured by the position sensing device 314, centroid 414 of the emission spot 402 may be used to determine the position of the cleaved end 308 of the optical fiber 304.

The tilt measurement and the position measurement may be part of the alignment offset used to determine whether emission spot 402 (e.g., corresponding to the cleaved end 308 of the optical fiber 304) is in an alignment position. The alignment position may be a position at which the emission spot 402 is located within a predefined tolerance from a reference zero position.

For example, when aligning the fiber to the system, an initial measurement is taken of the position reference output 350 and the tilt reference output 352. The fiber is first rotated to a second rotation position in the v-direction and w-direction until the tilt reference output is reduced below a predefined threshold. Next, the fiber is rotated to a second translation position in the y-direction and z-direction until the position reference output 350 is reduced below a predefined threshold. Once completed, the tilt reference output 352 is regenerated. If the tilt reference output 352 has increased beyond the predefined threshold, the optical fiber is then moved to a third rotational position and the entire process is iterated until both the position reference output 350 and tilt reference output 352 are reduced to values less than the corresponding threshold.

In some embodiments, it may be desirable to position the cleaved end 308 of the optical fiber 304 at an alignment position prior to positioning and alignment of an MLA in order to collect a reference alignment output. For example, the alignment position of the emission spot 402 may be used as part of a reference output for positioning and aligning an MLA. The reference output may include a tilt value (e.g., the tilt measurement) and a position value (e.g., the position measurement). The reference output may provide a reading or coordinates as to the orientation, including positional and rotational (e.g., tilt), of the emission face of the optical fiber 304. The reading or coordinates of the reference output may be used as a reference point during the positioning and the alignment of the MLA. For example, as will be described in greater detail below, the reference output may be used to determine an alignment threshold for the MLA. In an embodiment, the MLA may be positioned and aligned such that the spot beam received by the tilt sensing device 312 and the position sensing device 314 after placement of the MLA is similar or the same as the spot beam received prior to placement of the MLA within the system 300.

The reference output may be generated from the tilt measurement and the position measurement. In some embodiments, the reference output may be a sum or reading of the tilt measurement and the position measurement. After the reference output is generated, the reference output may be compared to an alignment threshold. For example, the tilt measurement may be compared to a tilt threshold and the position measurement may be compared to a position threshold.

As shown by diagram 400A, the emission spot 402 of the optical fiber 304 may have a tilt offset 450. The tilt measurement generated from the tilt offset 450 may be compared with a tilt threshold 452. In some embodiments, the emission spot 402 may also include a positional offset. Similar to the tilt measurement, the position measurement generated from the positional offset may be compared with a position threshold.

If the tilt measurement is within the tilt threshold 452 and the position measurement is within the position threshold, then the MLA may be placed within the system 300. However, if either the tilt measurement or the position measurement is not within the tilt threshold 452 or the position threshold, respectively, then the cleaved end 308 of optical fiber 304 may be rotated, moved, or otherwise adjusted to orient the emission spot 402 to a modified position. For example, to generate the tilt measurement and the position measurement, the optical fiber 304 may be in a first position. If either one of the tilt measurement or the position measurement is not within a tilt threshold 452 or a position threshold, respectively, then the optical fiber 304 may be positioned to a second position. At the second position, a second tilt measurement and a second position measurement may be measured. The second tilt measurement and the second position measurement may be compared to the tilt threshold 452 and the position threshold, respectively. If the second tilt measurement and the second position measurement are within the respective thresholds, the MLA may be placed in the system 300. However, if the second tilt measurement and the second position measurement are not within the respective threshold, then the optical fiber 304 may be positioned in a third position. In this manner, generating the reference output and adjusting the optical fiber such that the reference output is within an alignment threshold may be an iterative process.

When the tilt measurement or the position measurement is not within a respective threshold, the cleaved end 308 of the optical fiber 304 may be positioned in a modified position. The optical fiber 304 may be positioned or adjusted using the stage 330. As noted above, moving or adjusting the position of the optical fiber 304 may be understood as moving the optical fiber 304 along one or more of the x-axis, y-axis, or z-axis, or rotating the optical fiber 304 about one or more of a u-rotation, v-rotation, or w-rotation.

In some embodiments, the degree or amount of movement utilized to position the optical fiber 304 such that the tilt measurement or the position measurement is within the respective threshold, may be computationally determined. For example, using the diagram 400A, a rotation angle may be determined based on the tilt offset 450 and/or the position offset of the emission spot 402. The rotation angle may be the degree or amount of rotation necessary for tilt offset 450 to align with the horizontal x-axis. In some cases, after rotating cleaved end 308 of optical fiber 304 based on the degree of tilt, another diagram 400A of emission spot 402 may be generated in the modified position.

The tilt offset and/or the position offset may be due to one of or both of the orientation of the optical fiber 304 or the cleaved end 308. For example, as described above, the cleaved end 308 may include a cleave angle. The cleave angle may determine the orientation or angle at which light beams 322 are emitted from the cleaved end 308. If the cleave angle is not zero or exactly perpendicular to the longitudinal length 306 of the optical fiber, then light beams 322 may be emitted at an angle that is not parallel to the longitudinal length 306 of the optical fiber 304, i.e., not parallel to the x-axis. In other words, if the cleave angle is zero, then light beams 322 would be emitted approximately parallel to the longitudinal length 306 of the optical fiber 304. Any variation from a zero cleave angle may impact the angle at which light beams 322 are emitted.

In embodiments in which the cleave angle is zero, any tilt measured by the tilt sensing device 312 may be due to the orientation of the optical fiber 304. Tilting of the optical fiber 304 due to orientation may mean that the cleaved end 308 is in a different plane than the opposing end 338. For example, if the optical fiber 304 is tilted but has a zero cleave angle, then the cleaved end 308 may be at a different position along the y-axis, x-axis, or z-axis than the opposing end 338. To address the tilt of the optical fiber 304, the stage 330 may move the optical fiber 304 in a respective direction to fix the tilt.

In embodiments where the cleaved end 308 is on the same plane as the opposing end 338, the optical fiber 304 may have tilt due to the cleaved end 308. For example, if the cleave angle of cleaved end 308 is non-zero, then the light beams 322 may be emitted at an angle with respect to the x-axis. Emittance of the light beams 322 at an angle may be measured as tilt by the tilt sensing device 312. To compensate for the tilt caused by the non-zero cleave angle, the optical fiber 304 may be rotated about the y-axis or v-rotation. In other words, the cleaved end 308 may be raised or lowered, while the opposing end 338 is lowered or raised, respectively. The degree to which the optical fiber is rotated under v-rotation may correspond to the degree to which the cleave angle of the cleaved end 308 varies from zero.

It should be understood that the type of rotation may vary depending on the orientation of the cleave angle for the cleaved end 308. For example, if the cleave angle is non-zero along the y-axis, then the optical fiber 304 may be rotated along a v-rotation (e.g., about the y-axis). If the cleave angle is non-zero along the z-axis, then the optical fiber 304 may be rotated along a u-rotation. It should be appreciated that in some embodiments the optical fiber 304 may be symmetrical. As such, there may be only two angles for the cleave angle. Variations in the x-direction may result in a more complex fiber face than a cleave angle. It should also be appreciated that the cleave angle may be non-zero in any combination of y-z coordinates, and as such, rotation of the optical fiber 304 to address the non-zero cleave angle may be done by a respective combination of the v-w rotations.

FIG. 4B is a diagram illustrating a diagram 400B of the emission spot 402 positioned such that the tilt measurement is within the tilt threshold 452. The diagram 400B may also illustrate the emission spot 402 positioned such that the position measurement is within the position threshold. The diagram 400B may be used to generate the tilt reference output 352.

Similarly, if the emission spot 402 had a position offset, then the optical fiber 304 may be moved until a position measurement for the emission spot 402 is within a position threshold. For example, the optical fiber 304 may be modified until the emission spot 402 aligns with the origin 454 of the z-y axis or at some predetermined z-y coordinates.

It should be appreciated that aligning the emission spot 402 with the tilt threshold 452 and a position threshold may be an iterative process. For example, if the cleaved end 308 is non-zero and a tilt measurement is determined, then the optical fiber 304 may first be rotated along a respective rotation based on the tilt offset 450. For example, based on the diagram 400A, the optical fiber 304 may be rotated along a v-rotation such that the cleaved end 308 is moved down the y-axis while the opposing end 338 is moved up the y-axis. Rotating the optical fiber 304 along the v-rotation may cause the position of the emission spot 402 to move downwards. As such, the position measurement generated by the position sensing device 314 may determine a position offset. Then, based on the position offset, the longitudinal length 306 of the optical fiber 304 may be moved up on the y-axis. Moving the longitudinal length 306 of the optical fiber 304 up the y-axis may affect the tilt measurement generated by the tilt sensing device 312. The optical fiber 304 may be rotated to address the tilt measurement, and the process may continue until both the tilt measurement is within the tilt threshold 452 and the position measurement is within the position threshold.

Once the tilt measurement and the position measurement of the emission spot 402 are within the tilt threshold 452 and the position threshold, respectively, a reference output, such as the position reference output 350 and the tilt reference output 352, may be generated. The reference output may be generated by at least one of the tilt measurement and/or the position measurement taken at the position of the optical fiber 304 that is within the threshold. In some embodiments, the tilt threshold 452 and/or the position threshold may vary depending on application. For example, in some applications, such as fusion splicing, the tolerance of the tilt threshold 452 and/or position threshold may be small, thereby allowing minimal variation orientation of emission spot 402. In other applications, the tolerance of the tilt threshold 452 and/or position threshold may be larger, thereby allowing more flexibility with respect to the angular orientation of emission spot 402.

After the reference output is generated, the MLA 340 may be placed within the system 300. It should be understood that, when generating the tilt measurement and the position measurement, and thereby the reference output, the MLA 340 may not be present within the system 300. Instead, the image of the emission spot 402 may be captured from the cleaved end 308 of the optical fiber 304 prior to placement of the MLA 340 within the system. After the reference output is generated, as described herein, the MLA 340 may be positioned between the cleaved end 308 of the optical fiber 304 and the MLA alignment system 310. Then, using the same or similar techniques as described above for capturing the tilt measurement and the position measurement, and generating the reference output therefrom, an MLA tilt value, an MLA position value, and an MLA beam output may be determined. For example, the MLA tilt value may be determined in a manner similar to how the tilt measurement is determined, the MLA position value may be determined in a manner similar to how the position measurement is determined, and the MLA beam output may be generated in a manner similar to how the reference output is generated.

The MLA 340 may be placed within the system 300 such that the lenslet 302 is in rough alignment with the cleaved end 308 of the optical fiber. Rough alignment, as used herein, may mean alignment according to human perception. For example, the MLA 340 may be positioned within the system 300 such that the lenslet 302 visually appears to be in alignment with the cleaved end 308 of the optical fiber 304. Due to the small size of the optical fiber and the lenslet 302 of the MLA, despite being in rough alignment, the cleaved end 308 and the lenslet 302 may not be in true alignment. Accordingly, to position and align the lenslet 302 with the cleaved end 308 of the optical fiber 304, the tilt sensing device 312 may measure an MLA tilt value and the position sensing device 314 may measure an MLA position value. The MLA tilt value may be measured in a manner similar to the tilt measurement and the MLA position value may be measured in a manner similar to the position measurement.

An MLA beam output may be generated from at least one of the MLA tilt value and/or the MLA position value. As noted above, the MLA beam output may be generated using a similar method as is used for generating the reference output. The main difference is that the reference output may be generated without the MLA present in the system 300 and the MLA beam output may be generated with the MLA present in the system 300. The MLA beam output may be compared to an alignment threshold. In an example embodiment, comparing the MLA beam output to an alignment threshold may include comparing the MLA tilt value to an MLA tilt threshold and/or comparing the MLA position value to an MLA position threshold. The alignment threshold may include one or both of the MLA tilt threshold and the MLA position threshold.

Generation of the MLA beam output may be a similar iterative process to generation of the reference output in that the MLA tilt value and/or the MLA position value may be measured and then compared to their respective thresholds. If the MLA tilt value and/or the MLA position value are not within a respective threshold, however, the position of the MLA 340 may be modified or adjusted, not the optical fiber 304.

Returning now to FIG. 3A, the MLA 340 may be placed and held within the system 300 on an MLA stage 342. The MLA stage 342 may be configured to modify or adjust the position of the MLA 340 along the x-axis, y-axis, and z-axis, and rotate the MLA 340 along a w-rotation, u-rotation, or v-rotation. The position of the MLA 340 may be modified or adjusted until the MLA beam output is within the alignment threshold. For example, the MLA 340 maybe modified or adjusted until the MLA tilt value and the MLA position are within the MLA tilt threshold and the MLA position threshold, respectively. As noted, the tolerance of the alignment threshold may differ based on application.

Figure 5A:
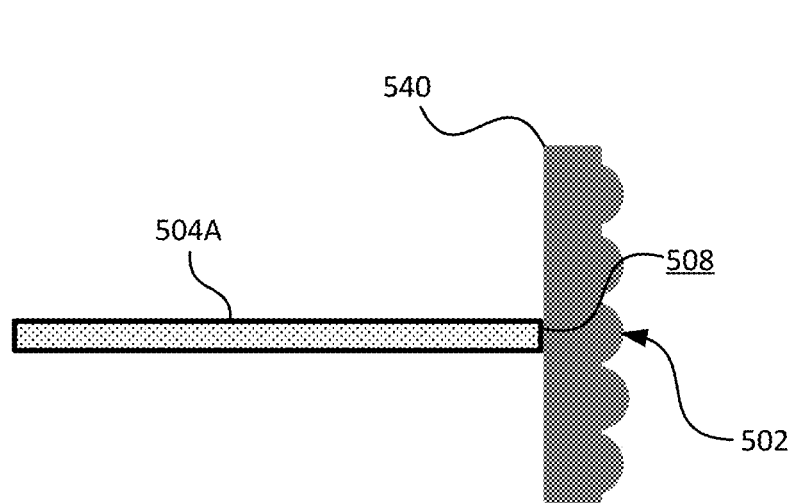
FIG. 5A is a simplified schematic diagram illustrating alignment of an optical fiber with a lenslet in an MLA using the MLA alignment system illustrated in FIG. 3A.

Once the MLA beam output is within the alignment threshold, the optical fiber 304 may be attached to a lenslet 302 of the MLA 340. Turning now to FIG. 5A, a simplified schematic diagram 500A illustrating alignment of an optical fiber with a lenslet in an MLA using the MLA alignment system illustrated in FIG. 3A is provided. The following discussion for FIGS. 5A and 5B will be made with reference to FIG. 3A; however, it should be understood that any system described herein may be used.

As shown by simplified schematic diagram 500A, an optical fiber 504A may be aligned with a lenslet 502 of an MLA 540. The optical fiber 504A may be the same or similar to the optical fiber 304. The optical fiber 504A may be positioned and aligned with the lenslet 502 using the system 300, specifically using the MLA alignment system 310, as described above. Once an MLA beam output for the MLA 540 is within the alignment threshold, as described above, a cleaved end 508 of the optical fiber 504A may be attached to the lenslet 502. Attaching the cleaved end 508 to the lenslet 502 may include securing, adhering, bonding, welding, optically contacting or fusing the cleaved end 508 to the lenslet 502.

In some embodiments, the optical fiber 504A may be different from the optical fiber 304. In such cases, the optical fiber 304 may be a "golden fiber." A "golden fiber" may be a fiber that has a desired manufacturing property, such as a desired cleave angle. The optical fiber 304, when utilized as a golden fiber, may be used to align the MLA 540, but may be removed from the system 300 after the MLA 540 is within the alignment threshold and the optical fiber 504A may be placed therein for the securing process. The optical fiber 304 as the golden fiber may be used for alignment of each lenslet in the MLA 540. This may advantageously allow each of the lenslets to be aligned using the same cleaved end 308, thereby providing a common alignment reference for each of the lenslets.

Figure 5B:
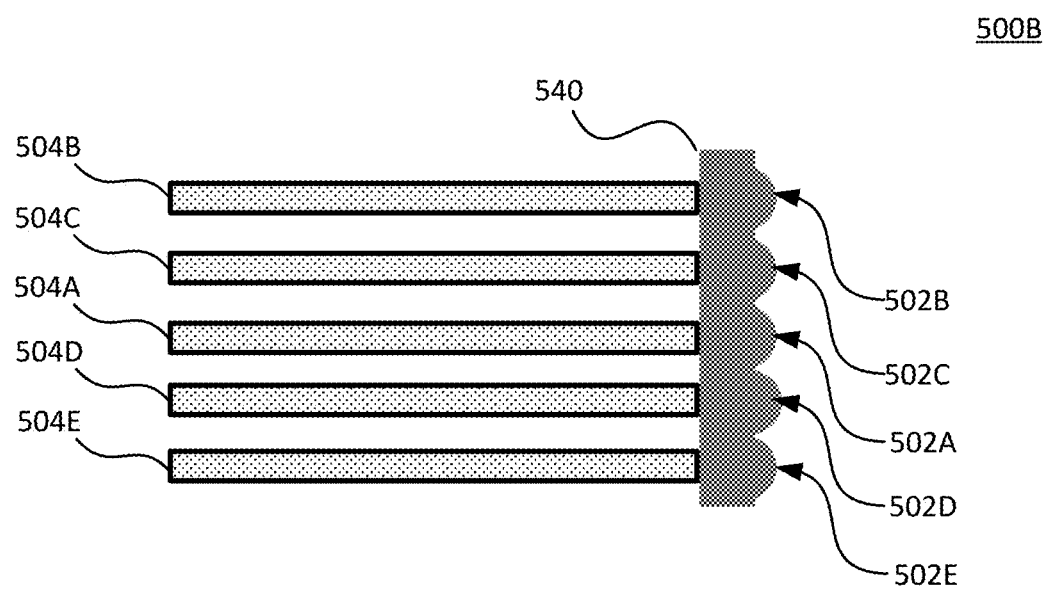
FIG. 5B is a simplified schematic diagram illustrating alignment of multiple optical fibers with multiple lenslets in an MLA using the MLA alignment system illustrated in FIG. 3A.

FIG. 5B provides a simplified schematic diagram 500B illustrating alignment of multiple optical fibers 504A-E with lenslets 502A-E, i.e., multiple lenslets, in the MLA 540 using the MLA alignment system illustrated in FIG. 3A. In some embodiments, each of the lenslets 502A-E of the MLA 540 may be aligned with one of the multiple optical fibers 504A-E. For example, the lenslet 502A may be aligned with the optical fiber 504A, the lenslet 502B may be aligned with the optical fiber 504B, the lenslet 502C may be aligned with the optical fiber 504C, the lenslet 502D may be aligned with the optical fiber 504D, and the lenslet 502E may be aligned with the optical fiber 504E.

As noted above, a golden fiber may be used for alignment of each of the lenslets 502A-E. For example, the optical fiber 304 may be used to align each of the lenslets 502A-E using the MLA alignment system 310. In such an example, the MLA 340 may be the same as the MLA 540. Once each of the lenslets 502A-E are in an alignment position, based on the alignment threshold, then the optical fiber 304 may be removed from the system 300 and replaced with one of the multiple optical fibers 504A-E for each of the respective lenslets 502A-E. For example, the optical fiber 304 may be used for alignment of the lenslet 502A. Once the lenslet 502A is within the alignment threshold (based on the MLA tilt value and the MLA position value for the optical fiber 304), the optical fiber 304 may be replaced with the optical fiber 504A in the system 300. Then the optical fiber 504A may be secured to the lenslet 502A. Once the optical fiber 504A is secured to the lenslet 502A, the MLA 540 may be repositioned and the optical fiber 304 may be positioned back on the stage 330. The MLA 540 may be positioned such that the lenslet 502B is in rough alignment with the optical fiber 304. The process may then continue through aligning the lenslet 502B with the optical fiber 304 and then replacing the optical fiber 304 with the optical fiber 504B and securing the optical fiber 504B to the lenslet 502B. The process may continue for each of the multiple optical fibers 504A-E. It should be understood that any number of multiple optical fibers 504A-E and any number of lenslets 502A-E may be aligned and/or secured using the systems and techniques used herein.

Figure 6:
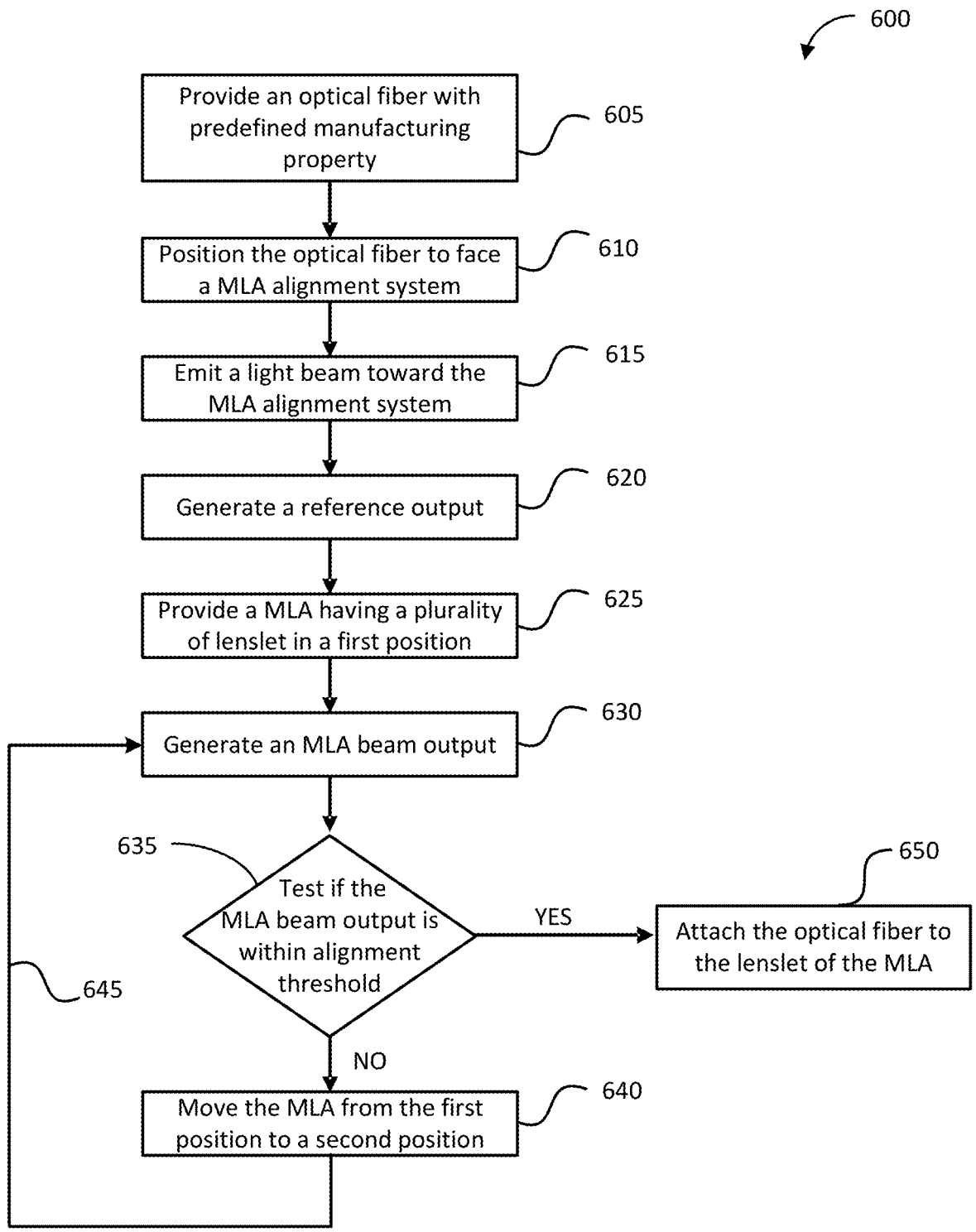
FIG. 6 is a simplified flowchart illustrating a method of aligning an optical fiber with an MLA using an MLA alignment system according to an embodiment of the present invention.

FIG. 6 provides a simplified flowchart illustrating a method 600 of aligning an optical fiber with an MLA using an MLA alignment system according to an embodiment of the present invention. The following discussion is made with reference to FIGS. 3-5B; however, it should be understood that the method 600 may be performed using any system or technique described herein.

The method 600 may include step 605. At step 605, an optical fiber, such as optical fiber 304, having a first end and a second end, may be provided. The first end of the optical fiber may include one or more predefined manufacturing properties. For example, the first end of the optical fiber 304 may be the cleaved end 308 having a predefined cleave angle.

At step 610, the method 600 may include positioning the optical fiber such that the first end of the optical fiber faces an MLA alignment system. For example, at step 610, the optical fiber 304 may be positioned such that the cleaved end 308 faces the MLA alignment system 310. The MLA alignment system may include a tilt sensing device, such as the tilt sensing device 312, and a position sensing device, such as the position sensing device 314.

At step 615, the method 600 may include emitting a light beam from the first end of the optical fiber toward the MLA alignment system. For example, a light beam may be emitted from the cleaved end 308 of the optical fiber 304 toward the MLA alignment system 310. In some embodiments, the MLA alignment system 310 may further include a beam splitter 316 and a collecting lens, also referred to as a collection lens, such as the collecting lens 320. In such cases, step 615 may further include transmitting a first portion of the light beam from the cleaved end 308 of the optical fiber 304 through the beam splitter 316 before reaching the position sensing device 314 and reflecting a second portion of the light beam from the cleaved end 308 of the optical fiber 304 off of the beam splitter 316 and through the collecting lens 320 before reaching the tilt sensing device 312.

At step 620, the method 600 may include generating a reference output for the optical fiber 304 in a first position. A reference output may be generated prior to placing the MLA 340 between the optical fiber 304 and the MLA alignment system 310. As discussed above with respect to FIGS. 4A and 4B, the reference output may include at least one of a tilt measurement or a position measurement. As such, in some embodiments, the step 620 may include measuring, via the tilt sensing device, a first tilt measurement based on the light beam emitted from the first end of the optical fiber in the first position and measuring, via the position sensing device, a first position measurement based on the light beam emitted from the first end of the optical fiber in the first position. The first tilt measurement may be compared to a tilt threshold and the first position measurement may be compared to a position threshold.

If the first tilt measurement and/or the first position measurement are not within the tilt threshold and position threshold, respectively, then the method 600 may further include positioning the optical fiber in a second position. For example, the optical fiber may be moved or adjusted from the first position to the second position by moving the optical fiber along the x-axis, y-axis, z-axis, or rotating the optical fiber along a w-rotation, v-rotation, or u-rotation. At the second position, a second tilt measurement and a second position measurement may be gathered by the tilt sensing device 312 and the position sensing device 314, respectively.

A second reference output may be generated based on the second tilt measurement and the second position measurement. In some embodiments, the second tilt measurement may be compared to the tilt threshold and the second position measurement may be compared to the position threshold. As noted above, the method 600 may be an iterative process in which the positioning of the optical fiber 304 may be modified until the tilt measurement and/or the position measurement are within the tilt threshold and the position threshold, respectively. Once the tilt measurement and the position measurement are within their respective thresholds, the method 600 may continue to the next step.

At step 625, the method may include providing an MLA, such as the MLA 340, having a plurality of lenslets in a first position between the first end of the optical fiber and the MLA alignment system. In some embodiments, the MLA 340 may be positioned such that the lenslet 302 is in rough alignment with the cleaved end 308 of the optical fiber 304. For example, the MLA 340 may be placed in the first position such that the light beam emitting from the cleaved end 308 of the optical fiber 304 transmits through the lenslet 302 of the MLA 340.

Once the MLA 340 is in the first position, an MLA beam output may be generated at step 630. The MLA beam output may include at least one of a first MLA tilt value or a first MLA position value. The MLA beam output may be generated by measuring, via the tilt sensing device 312, the first MLA tilt value and measuring, via the position sensing device, the first MLA position value.

At step 635, the method may include comparing the MLA beam output to an alignment threshold. In some embodiments, comparing the MLA beam output to the alignment threshold may include comparing the first MLA tilt value to an MLA tilt threshold, and comparing the first MLA position value to an MLA position threshold. In an example embodiment, the alignment threshold may include the first MLA tilt threshold and the first MLA position threshold.

If the MLA beam output is not within the alignment threshold, then the method 600 may continue to step 640. At step 640, the MLA 340 may be moved from the first position to a second position. For example, moving the MLA 340 from the first position to the second position may include moving or adjusting the MLA 340 along at least one of an x-axis, a y-axis, z-axis, w-rotation, u-rotation, or v-rotation. Once the MLA 340 is at the second position, the method 600 may return to step 630 via iterative step 645. At step 630, a second MLA beam output may be generated based on the second position of the MLA. To generate the second MLA beam output, a second MLA tilt value may be measured via the tilt sensing device 312 and a second MLA position value may be measured via the position sensing device 314.

The second MLA beam output may then be compared to the alignment threshold at step 635. For example, the second MLA tilt value may be compared to the MLA tilt threshold and the second MLA position value may be compared to the MLA position threshold. The method 600 is an iterative process in that steps 630-645 may repeat until the MLA beam output is within the alignment threshold.

Once the MLA beam output is within the alignment threshold, the method 600 may continue to step 650. At step 650, the optical fiber 304 may be attached to the lenslet 302 of the MLA 340. In some embodiments, a different optical fiber than the optical fiber 304 may be attached to the lenslet 302. For example, as described with respect to FIGS. 5A and 5B, the optical fiber 304 may be a golden fiber and once the MLA 340 is in an alignment position, the optical fiber 304 may be replaced with the optical fiber 504A. The optical fiber 504A may be attached or secured to the lenslet 302. Attaching the optical fiber 304 (or the optical fiber 504A) to the lenslet 302 of the MLA 340 may include securing or bonding the cleaved end 308 of the optical fiber 304 to the lenslet 302.

It should be appreciated that the specific steps illustrated in FIG. 6 provide a particular method of aligning an optical fiber with an MLA using an MLA alignment system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
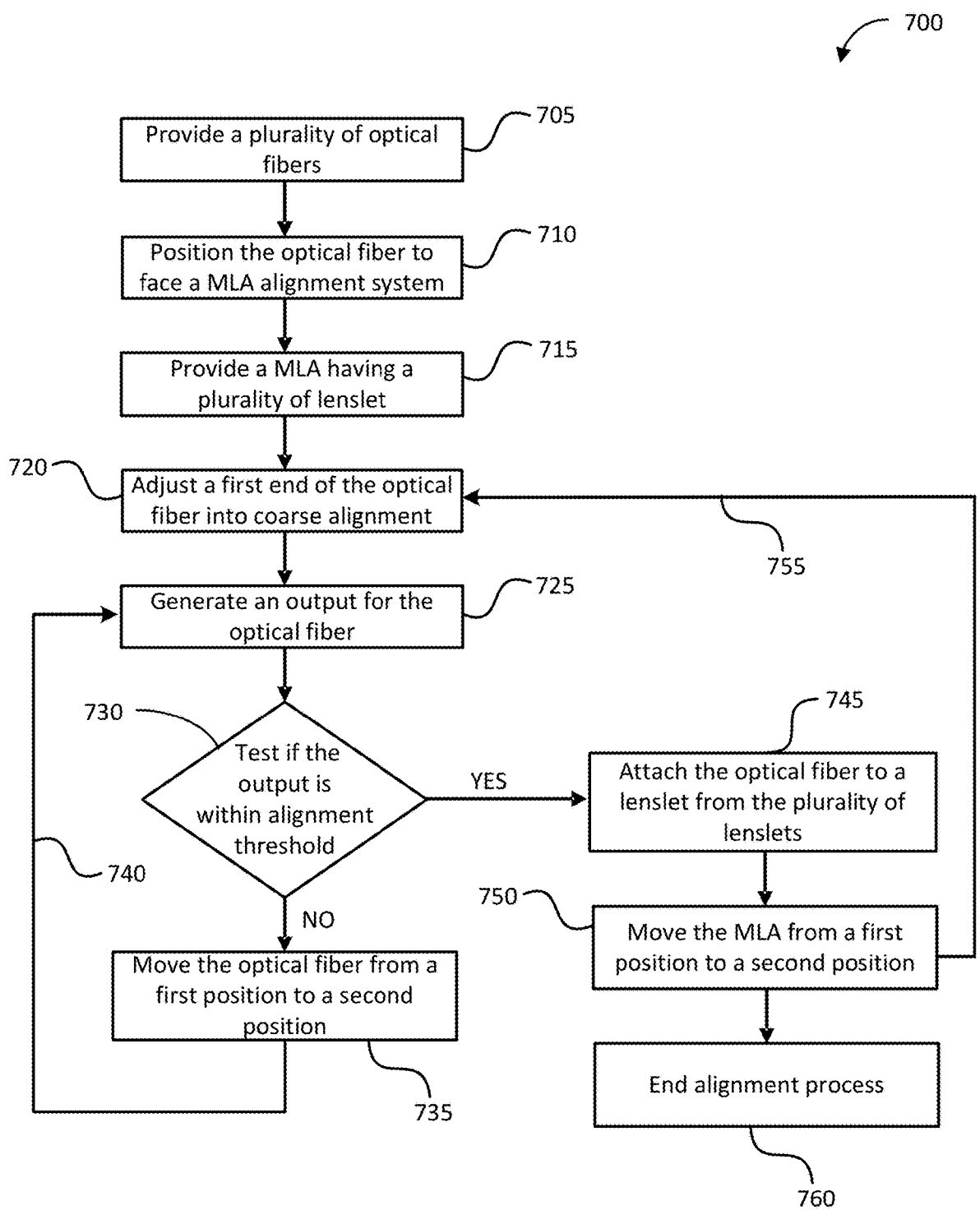
FIG. 7 is a simplified flowchart illustrating a method of aligning multiple optical fibers with multiple lenslets of an MLA using an MLA alignment system according to an embodiment of the present invention.

FIG. 7 provides a simplified flowchart illustrating a method of aligning multiple optical fibers with multiple lenslets of an MLA using an MLA alignment system according to an embodiment of the present invention. The following discussion is made with reference to FIGS. 3-5B; however, it should be understood that the method 700 may be performed using any system or technique described herein.

At step 705, the method 700 may include providing a plurality of optical fibers. For example, multiple optical fibers 504A-E may be provided. The multiple optical fibers 504A-E may include a first optical fiber having a first end and a second end and a second optical fiber having a third end and a fourth end. At step 710, a first optical fiber, such as the optical fiber 504A, may be positioned such that the first end (e.g., the cleaved end 308) faces an MLA alignment system, such as the MLA alignment system 310. The MLA alignment system may include a tilt sensing device, such as the tilt sensing device 312, and a position sensing device, such as the position sensing device 314.

At step 715, an MLA having a plurality of lenslets may be provided at a first position. For example, the MLA 340 having a plurality of lenslets may be provided between the cleaved end 308 of the optical fiber 304 and the MLA alignment system 310. As noted with reference to FIGS. 5A and 5B, the MLA may have a plurality of lenslets, such as lenslets 502A-E, including a first lenslet and a second lenslet. For example, the lenslet 502A may be the first lenslet and the lenslet 502B may be the second lenslet.

In some embodiments, the method 700 may include emitting a light beam from the first end of the first optical fiber. In an example embodiment, the MLA alignment system 310 may include a beam splitter, such as beam splitter 316, and a collecting lens, such as the collecting lens 320. In such examples, the light beam emitted from the first end of the first optical fiber may include transmitting a first portion of the light beam from the first end of the first optical fiber through the beam splitter 316 before reaching the position sensing device 314 and reflecting a second portion of the light beam from the first end of the first optical fiber off of the beam splitter 316 and through the collecting lens 320 before reaching the tilt sensing device 312.

At step 720, the first end of the optical fiber may be adjusted into coarse alignment with the first lenslet. For example, the cleaved end of the optical fiber 504A may be adjusted into coarse alignment with the lenslet 502A. In some embodiments, adjusting the first end of the optical fiber into coarse alignment with the first lenslet may include positioning the first end of the optical fiber at a predetermined distance from a surface of the first lenslet. As noted above, coarse alignment may mean alignment of the first end of the optical fiber with the first lenslet according to the human perception (e.g., visually aligning the first end with the first lenslet).

At step 725, an output may be generated. For example, a first MLA beam output may be generated for the first optical fiber. The first MLA beam output may include at least one of a first tilt value or a first position value. The first tilt value may be measured by the tilt sensing device 312 and the first position value may be measured by the position sensing device 314.

At step 730, the first MLA beam output may be compared to an alignment threshold. The alignment threshold may include at least one of an MLA tilt threshold or an MLA position threshold. If at step 730, the MLA beam output is not within the alignment threshold, then the method 700 may continue to step 735. At step 735, the optical fiber may be moved from a first position to a second position. For example, the optical fiber 304 may be moved or adjusted along an x-axis, a y-axis, z-axis, or rotated along a w-rotation, a u-rotation, or a v-rotation.

The method 700 may return to step 725 via iteration step 740. At step 725, a second MLA beam output may be generated for the optical fiber in the second position. For example, a second MLA tilt value may be measured via the tilt sensing device 312 and a second MLA position value may be measured via the position sensing device 314. The second output may be generated based on the second MLA tilt value and the second MLA position value.

At step 730, the second MLA beam output may be compared to the alignment threshold. In some embodiments, the second MLA tilt value may be compared to the MLA tilt threshold and the second MLA position value may be compared to the MLA position threshold. The method 700 may be an iterative process in that steps 725-740 may be performed until the MLA beam output is within the alignment threshold.

Once the MLA beam output is within the alignment threshold, the method may continue to step 745. At step 745, the optical fiber may be attached to the lenslet. For example, the first end of the first optical fiber may be attached to the first lenslet of the plurality of lenslets. As discussed above with reference to FIG. 5B, a first end of the optical fiber 504A may be attached to the lenslet 502A. Attaching the optical fiber to the lenslet may include securing or bonding the optical fiber to the lenslet.

Once the first end of the first optical fiber is attached to the first lenslet, the MLA may be moved from the first position to the second position at step 750. Moving the MLA to the second position may include moving the MLA to a second position between the third end of the second optical fiber and the MLA alignment system. The method 700 may return to step 720 via iteration step 755. At step 720, the third end of the second optical fiber may be adjusted into coarse alignment with the second lenslet. For example, with reference to FIG. 5B, after the optical fiber 504A is attached to the lenslet 502A, the MLA 540 may be moved to a second position such that the optical fiber 504B is in coarse alignment with the lenslet 502B. Specifically, the third end of the optical fiber 504B may be adjusted into coarse alignment with the lenslet 502B.

After the third end of the optical fiber 504B is in coarse alignment with the lenslet 502B, then a second MLA beam output for the optical fiber 504B may be generated and the method 700 may continue through steps 730-740 until the second MLA beam output for the optical fiber 504B is within the alignment threshold. At that point, the optical fiber 504B may be attached to the lenslet 502B at step 745. Then at step 750, the MLA may be moved to a third position between a fifth end of a third optical fiber, such as the optical fiber 504C, and the MLA alignment system such that the fifth end of the third optical fiber is in coarse alignment with a third lenslet, such as the lenslet 502C, at step 720.

The method 700 may continue until all of the plurality of optical fibers are attached to a respective lenslet in the MLA. At that point, the method 700 may continue to step 760 at which the alignment process is ended.

It should be appreciated that the specific steps illustrated in FIG. 7 provide a particular method of aligning multiple optical fibers with multiple lenslets of an MLA using an MLA alignment system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

During an alignment process, an optical fiber may be aligned with an external body. For example, optical fibers are often spliced to various external bodies, such as another optical fiber or a piece of optical equipment, and precise alignment between the optical fiber and the external body is utilized to maximized power transmission to or from the external body.

During the alignment process it is generally important to align the fiber such that light emitted by the optical fiber is minimally offset with respect to a corresponding end component. For example, a cleave angle of a cleaved end of an optical fiber may impact the offset or orientation of light emitted by the optical fiber. Any offset in the emitted light may impact the performance of the optical fiber in an optical system. Conventional cleave angle measurement systems and techniques are often unable to measure the cleave angle to within a degree of angle and often have minimal repeatability.

Manufacturing properties of the optical fiber, however, may impact the alignment process. For example, an optical fiber may include a cleaved end. The cleaved end of an optical fiber may be an end of the optical fiber having a cleave or cut that is generally perpendicular to the longitudinal length of the optical fiber. The cleave is generally made during a manufacturing process of the optical fiber. The angle of the cleaved end, referred to herein as a cleave angle, may impact the alignment process. The cleave angle is a reference to how perpendicular the cleaved end of the optical fiber is to the optical axis of the fiber. Typically, the optical axis of the optical fiber is aligned with the longitudinal length of the optical fiber, and thus the cleave angle may be the degree to which the cleaved end is perpendicular to the length of the optical fiber.

The cleave angle of an optical fiber may impact the alignment process for the optical fiber. Specifically, the cleave angle of the optical fiber may impact the angle and orientation (e.g., offset) at which light is emitted from the cleaved end of the optical fiber. Conventional approaches, however, to measuring the cleave angle of an optical fiber are often unable to measure the cleave angle to within a degree of angle and often have minimal repeatability. Moreover, conventional methods may be fiber type-specific, requiring mode matching and wavelength matching between the optical fiber and the measuring equipment. As such, there is a need in the art for improved methods and systems related to measuring a cleave angle of an optical fiber.

To provide accurate and consistent measurements of a cleave angle of an optical fiber to below 1 degree of angle, a cleave angle measurement system is provided herein. FIG. 8A provides a simplified schematic diagram of a cleave angle measurement system 800 according to an embodiment of the present invention. The cleave angle measurement system 800 may allow for measuring of a cleave angle of an optical fiber 804. Specifically, the cleave angle measurement system 800 may measure the cleave angle of a cleaved end 808 of the optical fiber 804. As noted above, the cleaved end 808 of the optical fiber 804 may be formed during a manufacturing process of the optical fiber 804. For example, the optical fiber 804 may be cleaved or otherwise cut from a spool or longer length of optical fiber. During the cleaving process, the cleaved end 808 may be formed having a cleave angle. As will be discussed in greater detail below, the cleave angle may be a reference to how perpendicular the cleaved end 808 of the optical fiber 804 is to the optical axis of the optical fiber 804. The optical axis of the optical fiber 804 may be parallel with the longitudinal length 834 of the optical fiber 804.

The optical fiber 804 may be a polarization maintaining fiber having one or more stress rods, a patterned microstructure, or one or more cores. In some embodiments, the optical fiber 804 may be or include a bow-tie fiber, a panda fiber, a multi-core fiber, an elliptical fiber, a photonic crystal optical fiber, or the like. The optical fiber 804 may have a diameter that is less than 250 µm. For example, the optical fiber 804 may have a diameter that is less than 225 µm, less than 200 µm, less than 175 µm, less than 150 µm, less than 125 µm, or less than 100 µm. In some embodiments, the optical fiber 804 may have a diameter that is greater than 250 µm. For example, the diameter of the optical fiber 804 may be greater than 300 µm, 350 µm, or 400 µm. The diameter of the optical fiber 804 may depend on the type of the optical fiber.

The cleave angle measurement system 800 may be able to measure the cleave angle of the optical fiber 804 to within a degree of angle. In some embodiments, the cleave angle measurement system 800 may be able to measure the cleave angle of the optical fiber to within a 0.5 degree of angle, to within a 0.3 degree of angle, or within a 0.25 degree of angle. In other words, the cleave angle measurement system 800 is able to measure the cleave angle with precise accuracy. In addition to the precise accuracy achievable by the cleave angle measurement system 800, the cleave angle measurement system 800 provides consistent repeatability of a cleave angle measurement. The repeatability and the precise measurements provided by the cleave angle measurement system 800 illustrate the accuracy at which the cleave angle measurement system 800 is able to measure the cleave angle of the optical fiber 804.

To measure the cleave angle of the optical fiber 804, the cleave angle measurement system 800 may include stage 830, a light source 820, and an image sensor 810. In some embodiments, the stage 830 may include an optical fiber channel 832. The optical fiber channel 832 may be a portion of the stage 830 that is configured to receive at least a portion of a longitudinal length 834 of the optical fiber 804. For example, the optical fiber channel 832 may be a v-groove. The optical fiber channel 832 may be optimized or adjusted for various cladding diameters of the optical fiber 804.

The optical fiber channel 832 may also be configured to secure the optical fiber 804 during the cleave angle measurement process. To hold the optical fiber 804 in the desired position, the optical fiber 804 may be held in place by one side. It is often desired to hold the optical fiber 804 such that it can be easily released from the desired position without impacting the position of the optical fiber 804. A common means of holding the optical fiber 804 in a desired position that allow for easy release of the optical fiber 804 may include a vacuum chuck or other clamping mechanisms. As such, in some embodiments, the optical fiber channel 832 may include a vacuum chuck or a clamp for securing the optical fiber 804 in the optical fiber channel 832.

In some embodiments, the optical fiber 804 may be placed in the optical fiber channel 832 such that at least a portion of a fiber core or cladding of the optical fiber 804 is secured by the optical fiber channel 832. For ease of discussion, FIG. 8B is provided to illustrate a side view of the optical fiber 804 as provided in the cleave angle measurement system 800. As shown by FIG. 8B, the optical fiber 804 may include a fiber body 806 and a fiber core/cladding 802. The fiber core/cladding 802 may be referred to as an inner portion of the optical fiber 804. The fiber core/cladding 802 can terminate at an emission face 805. The fiber body 806 includes a jacket 803 surrounding the fiber core/cladding 802 in the fiber body 806. For example, the jacket 803 may be a plastic coating applied to the fiber core/cladding 802. Light is emitted from emission face 805 during operation of the optical fiber 804. The emission face 805 may be part of the cleaved end 808.

As noted above, the optical fiber 804 may include various manufacturing properties, such as the cleave angle. Other manufacturing properties of the optical fiber 804 may include a bend or curvature of the optical fiber 804 along the longitudinal length, L, of the optical fiber 804. During, or after the manufacturing process, the optical fiber 804 may be wound or rolled into a bundle, which can result in a bend or curvature of the optical fiber 804 along the longitudinal length 834. Additional manufacturing characteristics of the optical fiber 804 may include the material of the optical fiber 804, the material used to form the jacket 803, and the jacket 803 itself. For example, the jacket 803 may be applied such that the jacket 803 includes irregularities. Irregularities may include a thickness with which the jacket 803 is applied to the optical fiber 804. Irregularities may make an outer surface of the optical fiber 804 non-cylindrical. Any irregularities in the jacket 803 may negatively impact the measurement of the cleave angle. Additionally, the jacket 803 may cause for bending of the optical fiber due to memory caused by spooling of the optical fiber during the manufacturing process.

To prevent irregularities of the jacket 803 from impacting the cleave angle measurement, the jacket 803 may be removed over a portion of the longitudinal length 834 of the optical fiber 804. For example, a longitudinal length, L, of the fiber core/cladding 802, also referred to as an inner portion, may be exposed by removing the jacket 803 for that length. The longitudinal length, L, may start at the cleaved end 808 of the optical fiber 804 and extend along the longitudinal length 834. In some embodiments, the longitudinal length, L, may range from 1 mm to 25 mm, from 5 mm to 20 mm, or from 10 mm to 15 mm. In an example embodiment, the longitudinal length, L, from which the jacket 803 is removed, may be 10 mm or 1 cm.

The optical fiber 804 may be secured in the optical fiber channel 832 by the longitudinal length, L, of the fiber core/cladding 802. By holding the optical fiber 804 using the fiber core/cladding 802, the cleave angle measurement system 800 may provide for more accurate measurements and consistent repeatability of cleave angle measurements.

As those skilled in the art will readily appreciate, removing the jacket 803 from the fiber core/cladding 802 may not impact the functionality of the optical fiber 804. For example, many applications utilize removal or stripping of the jacket 803 of the optical fiber 804. Moreover, cleaving of the optical fiber 804 generally includes removal of a portion the jacket 803 from the cleaved end 808 of the optical fiber 804. Accordingly, removing the jacket 803 from the longitudinal length, L, of the fiber core/cladding 802 may not impact the functionality and applicability of the optical fiber 804.

Referring once again to FIG. 8A, the optical fiber 804 may be positioned in the optical fiber channel 832 such that the cleaved end 808 is in optical alignment with the light source 820. Optical alignment may mean that light beam 822, when transmitted by the light source 820, is directed onto the cleaved end 808 of the optical fiber 804. The light source 820 may be configured to emit the light beam 822 toward the cleaved end 808. For example, the light source 820 may include a laser, a light emitting diode (LED), an arc lamp, a fiber optic illuminator, an incandescent source, a fluorescent source, a phosphorescent source, or the like. In an example embodiment, the light source 820 may include an external laser.

As shown, the light source 820 may transmit the light beam 822 toward the cleaved end 808 such that the light beam 822 is reflected off of the cleaved end 808. The light beam 822 may reflect off of the cleaved end 808 as reflected light 824. The reflected light 824 may be received by the image sensor 810. The image sensor 810 may be configured to detect the reflected light 824. For example, the image sensor 810 may be or include a camera, quadrant photodiode, or other instrument capable of sensing light. In an example embodiment, the image sensor 810 may be a silicon imaging camera or an infrared camera.

In some embodiments, the reflected light 824 may be directed to the image sensor 810 by a beam splitter 840. The beam splitter 840 may be positioned in axial alignment with the optical fiber 804 and the light source 820. The beam splitter 840 may be positioned between the optical fiber 804 and the light source 820 along the x-axis. The beam splitter 840 may also be positioned to reflect the reflected light 824 to the image sensor 810. For example, the beam splitter 840 may include a surface 842 that reflects a portion of the reflected light 824 toward the image sensor 810. The surface 842 of the beam splitter 840 may be a reflective surface such as a mirror. In an example embodiment, the beam splitter 840 may be a non-polarizing beam splitter. For example, the beam splitter 840 may be a standard 50:50 beam splitter.

In some embodiments, the cleave angle measurement system 800 may include a beam collector 850. The beam collector 850 may collect stray light 826. Specifically, the beam collector 850 may prevent the stray light 826 from reaching the image sensor 810. For example, the beam collector 850 may be implemented as an empty tube or a light dump.

As illustrated, the cleave angle measurement system 800 may not include any additional lens to direct, refract, or collimate the light beam 822 or the reflected light 824. Conventional methods often include one or more lenses to manipulate the optical properties of light used to measure the cleave angle of an optical fiber. By not including a lens, the cleave angle measurement system 800 may include fewer components than conventional systems and may provide a faster and more convenient system and technique for measuring a cleave angle. For example, the cleave angle measurement system 800 may not require the positioning and lighting of components with a lens, thereby providing a more convenient method of measuring a cleave angle.

The image sensor 810 may be positioned at a distance, DEng, from the cleaved end 808 of the optical fiber 804. The distance, DEng, may be the total distance that the reflected light 824 travels from the cleaved end 808 to reach the image sensor 810. For example, the image sensor 810 may be positioned such that the distance, DEng, is at least 10 cm, at least 25 cm, at least 50 cm, or at least 100 cm from the cleaved end 808.

Figure 9A:
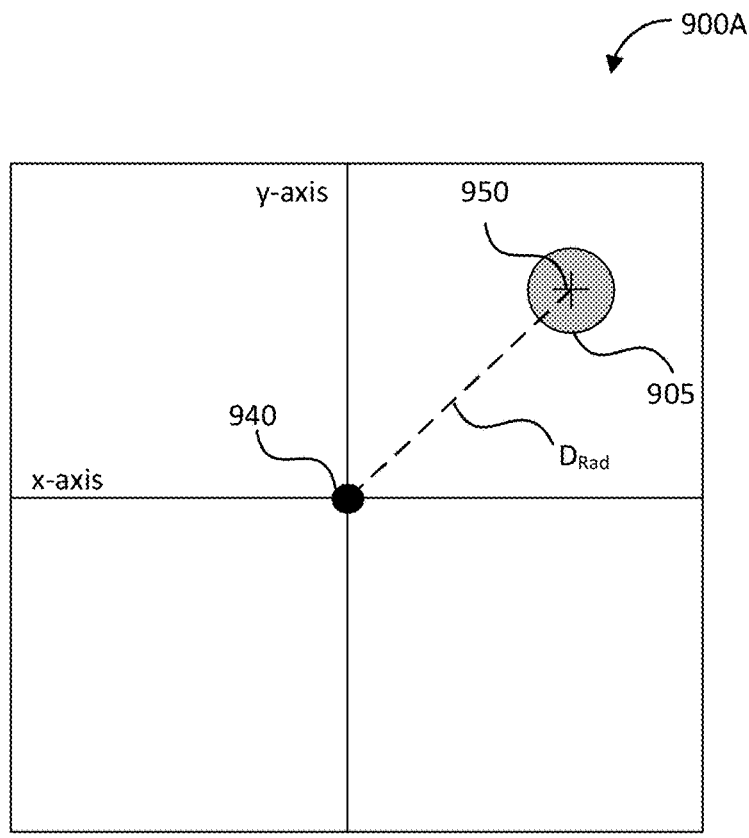
FIG. 9A is a diagram illustrating a computational image of an emission face measurement used to calculate a cleave angle according to an embodiment of the present invention.

The image sensor 810 may detect the reflected light 824 from the cleaved end 808. Specifically, the image sensor 810 may detect the emission face 805 of the optical fiber 804 to generate an emission face measurement. Turning now to FIG. 9A, a computational image 900A of an emission face measurement 905 used to calculate a cleave angle measurement is provided. Although the following discussion is with respect to FIGS. 8A and 8B, it should be understood any systems or techniques provided herein may be used.

The computational image 900A may be generated based on the reflected light 824 detected by the image sensor 810. For example, an image used to generate the computational image 900A may be captured by receiving the reflected light 824. One of several image processing methods can be utilized to detect and/or identify the various components of the optical fiber. In some embodiments, the various components of the optical fiber can be identified based on pixel coordinates within the captured image.

The computational image 900A may include an emission face measurement 905. The emission face measurement 905 may correspond to the emission face 805 of the optical fiber 804. The computational image 900A may include an x-axis and a y-axis. The emission face measurement 905 may be generated on the computational image 900A at x-y coordinates with respect to an optical center 940. The optical center 940 may be computationally determined. The optical center 940 may be an optical center of the image sensor 810. For example, as illustrated, the optical center 940 may be determined to be at an origin point of the x-y axes. Another method of determining the optical center 940 is discussed in greater detail with respect to FIG. 10.

A centroid 950 may be identified for the emission face measurement 905. The centroid 950 may be computationally determined as a center point within the emission face measurement 905. The centroid 950 of the emission face measurement 905 may be used to determine the cleave angle of the optical fiber 804. For example, a radial distance, $D_{Rad}$, for the optical fiber 804 may be determined based on the centroid 950. The radial distance, $D_{Rad}$, may be a distance from the centroid 950 of the optical fiber 804 to the optical center 940. The radial distance, $D_{Rad}$, may be measured in units of pixels or mm.

Figure 9B:
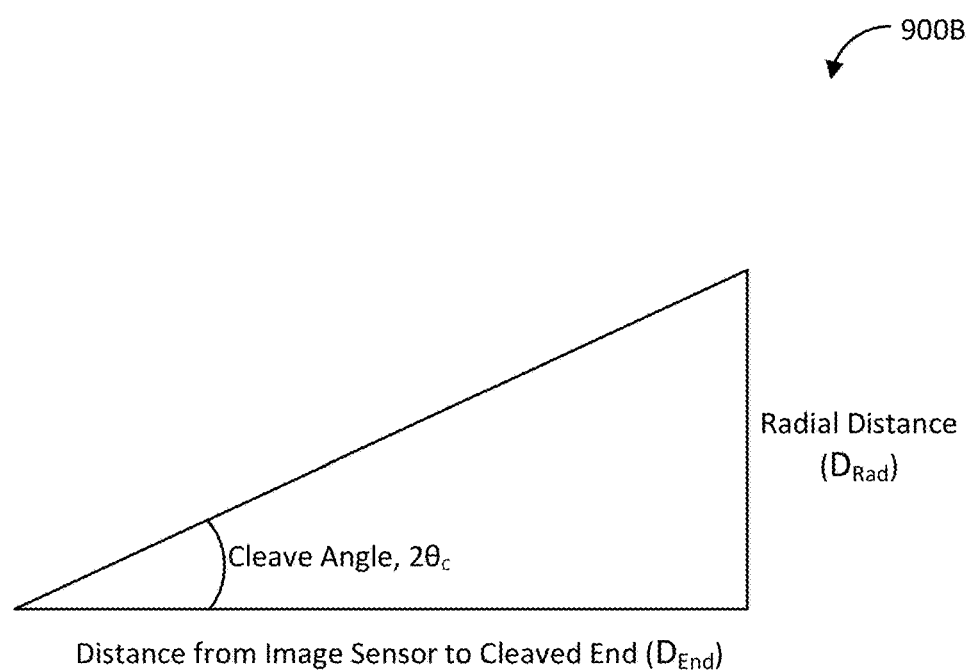
FIG. 9B is a diagram illustrating distance variable impacts on calculating a cleave angle according to an embodiment of the present invention.

Turning now to FIG. 9B, a diagram 900B illustrating distance variable impacts on calculating a cleave angle is provided. As shown by the diagram 900B, the cleave angle, $\theta_C$, may be determined based on the radial distance, $D_{Rad}$, and the distance, $D_{End}$, from the image sensor to the cleaved end.

Specifically, the cleave angle, $\theta_C$, may be calculated based on the following cleave angle equation:

$$\theta_C = \left(\tan^{-1}\left(\frac{D_{Rad}}{D_{End}}\right)\right)/2$$

The above cleave angle equation may provide a greater degree of accuracy over conventional cleave angle measurement techniques. For example, because the cleave angle equation is based off of the radial distance, $D_{Rad}$, which in turn is determined by light reflected off of the cleaved end 808 of the optical fiber 804, there may be an increase in sensitivity to cleave angle variation. In some embodiments, there may be a 50% increase in sensitivity gained by measuring the cleave angle, $\theta_C$, with reflected light 824 versus conventional methods that use light emitted from the cleaved end 808 of the optical fiber 804 or from conventional methods that use interferometry techniques. The increased sensitivity may allow for cleave angle measurements that are within a 0.5 degree angle measurement.

Importantly, because the above cleave angle equation uses the reflected light 824, the cleave angle measurement system 800 can measure any style of optical fiber 804. For example, the cleave angle measurement system 800 may use the geometry of the reflected beam after reflection from the optical fiber 804 to determine the emission face measurement 905 that is independent of fiber wavelength design, core size, and microstructures within the optical fiber 804. The cleave angle measurement system 800 may use light within the visible spectrum, thereby allowing for easy alignment and a more efficient cleave angle measurement method.

In some embodiments, the optical fiber 804 may be rotated to improve a cleave angle measurement. For example, the optical fiber 804 may be rotated about the x-axis via stage 830. The optical fiber 804 may be rotated from a first position by a pre-determined rotation amount to a second position. At the second position, the image sensor 810 may generate a second emission face measurement based on the reflected light 824.

Figure 10:
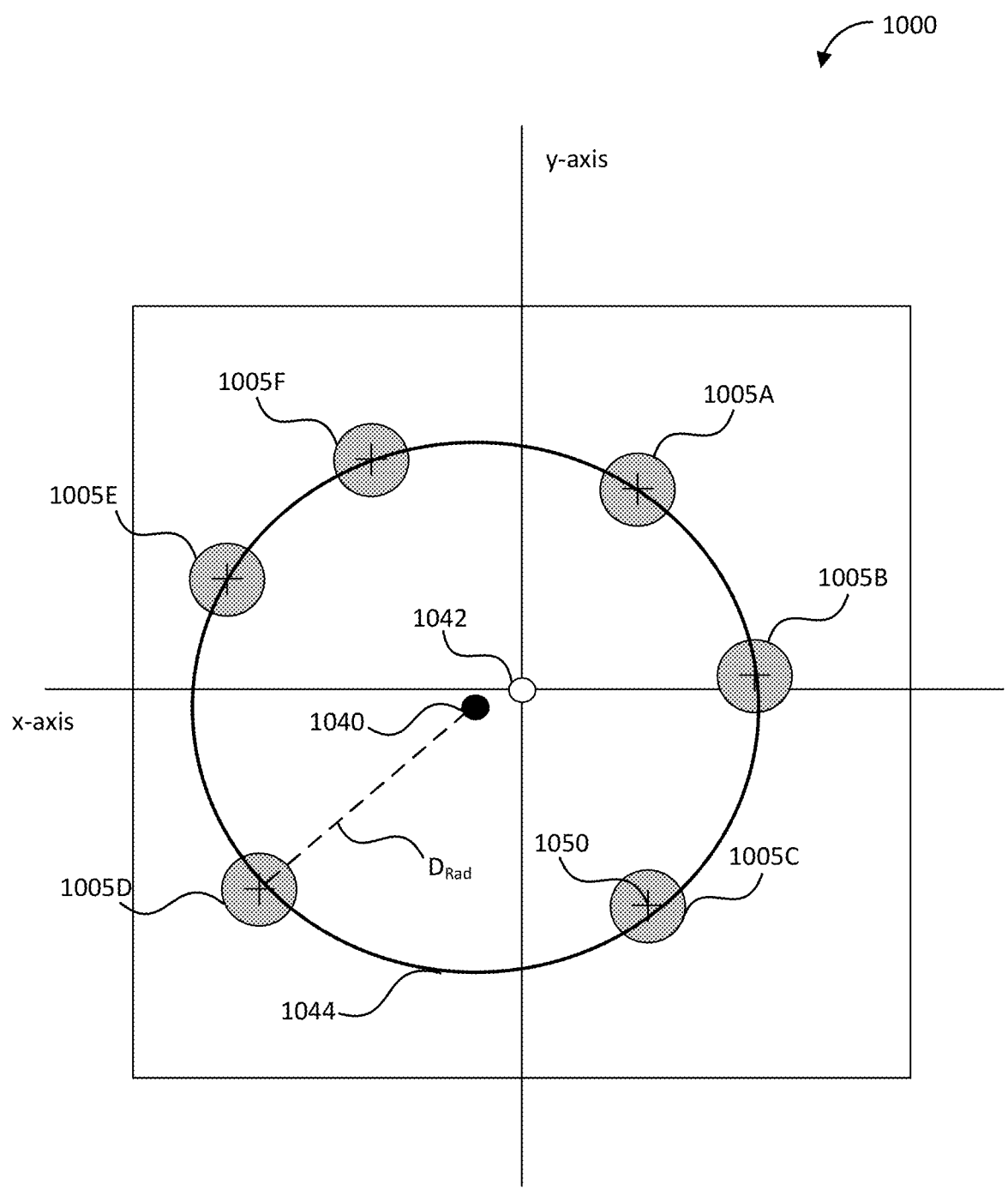
FIG. 10 is a diagram illustrating a computational image of multiple emission faces used to calculate a cleave angle according to an embodiment of the present invention.

Turning now to FIG. 10, a diagram illustrating a computational image 1000 of multiple emission face measurements used to calculate a cleave angle according to an embodiment of the present invention is provided. For ease of discussion, FIG. 10 is discussed with relation to FIGS. 8, 9A, and 9B; however it should be understood that any systems or techniques disclosed herein may be applicable.

As shown, the computational image 1000 may include multiple emission face measurements 1005A-F. Each of emission face measurements 1005A-F may correspond to the cleaved end 808 of the optical fiber 804 at a different rotational position. For example, the emission face measurement 1005A may be generated based on the optical fiber 804 in a first position. After generating the emission face measurement 1005A, the optical fiber 804 may be rotated by a pre-determined rotation amount to a second position. At the second position, the emission face measurement 1005B may be generated. The emission face measurements 1005C-F may be generated following the same technique for the optical fiber 804 in a third position, fourth position, fifth position, and sixth position, respectively. A centroid 1050 may be determined for each of the emission face measurements 1005A-F, as discussed with respect to FIG. 9A.

In some embodiments, such as the embodiment illustrated by FIG. 10, the computational image 1000 may be used to calibrate the cleave angle measurement system 800. For example, the computational image 1000 may be used to determine an optical center 1040 for the image sensor 810. The optical center 1040 may vary depending on the orientation of the optical fiber channel 832 and/or the optical fiber 804. For example, the optical fiber 804 may have a diameter that may impact the optical center 1040 of the image sensor 810. Additionally, the positioning of the optical fiber channel 832 with relation to the image sensor 810 may impact the optical center 1040 of the image sensor 810.

To determine the optical center 1040, an emission face arc 1044 may be determined. For example, the emission face arc 1044 may be determined based on the centroid 1050 for each of the emission face measurements 1005A-F. In other words, the emission face arc 1044 may be fitted to centroid 1050 for each of the emission face measurements 1005A-F. Then, based on the emission face arc 1044, the optical center 1040 may be determined as the central point of the emission face arc 1044. As illustrated in this embodiment, the optical center 1040 may not be an origin point 1042 of the x-y axes. Instead, the cleave angle measurement system 800 may be calibrated such that the optical center 1040 is based off of the optical fiber 804 and the current positioning of the components within the cleave angle measurement system 800, such as the optical fiber channel 832.

In some embodiments, the emission face arc 1044 may be mathematically determined for the emission face measurements 1005A-F. For example, the emission face arc 1044 may be determined using the following equations [I]-[XII], which include fitting least squares equations to a circle. Once determined, the emission face arc 1044 may be used to determine whether an emission face measurement within the emission face measurements 1005A-F is invalid or valid.

Equation [I] starts with an equation for a circle, where a and b correspond to the x-y coordinates, respectively, for the centroid of the emission face arc 1044. Here, the centroid of the emission face arc 1044 may be the optical center 1040. R is the radius for the emission face arc 1044. Here, R may be the radial distance, $D_{Rad}$.

$$(x-a)^2+(y-b)^2=R^2 \quad \text{[I]}$$

For a given measured point, i, on the emission face arc 1044, the residual error may be defined by $d_i$, characterized by the following equation [II].

$$d_i=\sqrt{(x_i-a)^2+(y_i-b)^2}-R^2 \quad \text{[II]}$$

A sum of residuals for n points is a function of a, b, and R, characterized by the following equation [III].

$$F(a,b,R)=\Sigma_{i=1}^n[(x_i-a)^2+(y_i-b)^2-R^2]^2 \quad \text{[III]}$$

Equation [III] as rewritten becomes equation [IV] based on equations [V]-[VII].

$$F(a,b,R)=\Sigma_{i=1}^n[x_i^2+y_i^2+Bx_i+Cy_i+D]^2 \quad \text{[IV]}$$

Where:

$$B=-2a \quad \text{[V]}$$

$$C=-2b \quad \text{[VI]}$$

$$D=a^2+b^2-R^2 \quad \text{[VII]}$$

Variable F in Equation [IV] is then differentiated with respect to B, C, and D to yield equations [VIII], [IX], and [X], as follows.

$$(\Sigma x_i)B+(\Sigma y_i)C+nD=-\Sigma(x_i^2+y_i^2) \quad \text{[VIII]}$$

$$(\Sigma x_iy_i)B+(\Sigma y_i^2)C+(\Sigma y_i)D=-\Sigma(x_i^2y_i+y_i^3) \quad \text{[IX]}$$

$$(\Sigma x_i^2)B+(\Sigma x_iy_i)C+(\Sigma x_i)D=-\Sigma(x_i^3+x_iy_i^2) \quad \text{[X]}$$

The Equations [VIII]-[X] may be reduced to a matrix, as illustrated by Equation [XI].

$$\begin{bmatrix} \sum x_i & \sum y_i & n \\ \sum x_i y_i & \sum y_i^2 & \sum y_i \\ \sum x_i^2 & \sum x_i y_i & \sum x_i \end{bmatrix} \begin{pmatrix} B \\ C \\ D \end{pmatrix} = \begin{pmatrix} -\sum (x_i^2 + y_i^2) \\ -\sum (x_i^2 y_i + y_i^3) \\ -\sum (x_i^3 + x_i y_i^2) \end{pmatrix} \quad \text{[XI]}$$

Equation [XI] may be in the form of:

$$Mv = p \quad \text{[XII]}$$

Solving Equations [I]-[XII] may determine variables B, C, and D. Once variables B, C, and D are known, an optimal centroid and radius for the emission face arc 1044 may be determined.

The emission face arc 1044 may correspond to the cleave angle of the optical fiber 804. For example, if the cleaved end 808 of the optical fiber 804 is perfectly cleaved, thereby being exactly perpendicular to the optical axis of the optical fiber 804, the emission face measurements 1005A-F would not precess when the optical fiber 804 is rotated about the optical axis (e.g., x-axis), and thus no emission face arc 1044 would be generated. Instead, the emission face measurements 1005A-F for the optical fiber 804 at different positions would stay in the same location on the computational image 1000. As the cleave angle increases, however, the emission face arc 1044 may also increase as the optical fiber 804 is rotated to different positions. As such, the emission face arc 1044 as illustrated may indicate the non-perfect cleave angle of the cleaved end 808 of the optical fiber 804.

A radial distance, $D_{Rad}$, for each of the emission face measurements 1005A-F may then be determined. The radial distance, $D_{Rad}$, may be the distance for each emission face measurement 1005A-F at a given position to the optical center 1040.

To calibrate the cleave angle measurement system 800, an optical fiber having a known cleave angle may be used for generation of emission face measurements 1005A-F. Then, using the known cleave angle and the determined radial distance, $D_{Rad}$, a correlation between the known cleave angle and the radial distance, $D_{Rad}$, can be determined. Because the cleave angle at the radial distance, $D_{Rad}$, is known, and a cleave angle at the optical center 1040 is known to be zero, then a cleave angle can be extrapolated or calculated for other radial distances, $D_{Rad}$.

In some embodiments, calibration of the cleave angle measurement system 800 may allow for swift cleave angle measurement processing of multiple optical fibers. For example, a single measurement may be used to determine a cleave angle for an optical fiber. Since the optical center 1040 is determined based on the above-described calibration process, and a correlation between cleave angle and radial distance, $D_{Rad}$, is determined, a cleave angle may be determined based on a single emission face measurement. Specifically, the cleave angle may be determined based on a radial distance, $D_{Rad}$, for the single emission face measurement.

In some embodiments, additional emission faces measurements may be collected to increase the accuracy of the cleave angle measurement or to verify the validity of the initial cleave angle measurement. As any noise within the cleave angle measurement system 800 may impact a cleave angle measurement, verifying the validity of a cleave angle measurement may be advantageous to improve the accuracy of a cleave angle measurement.

Figure 11A:
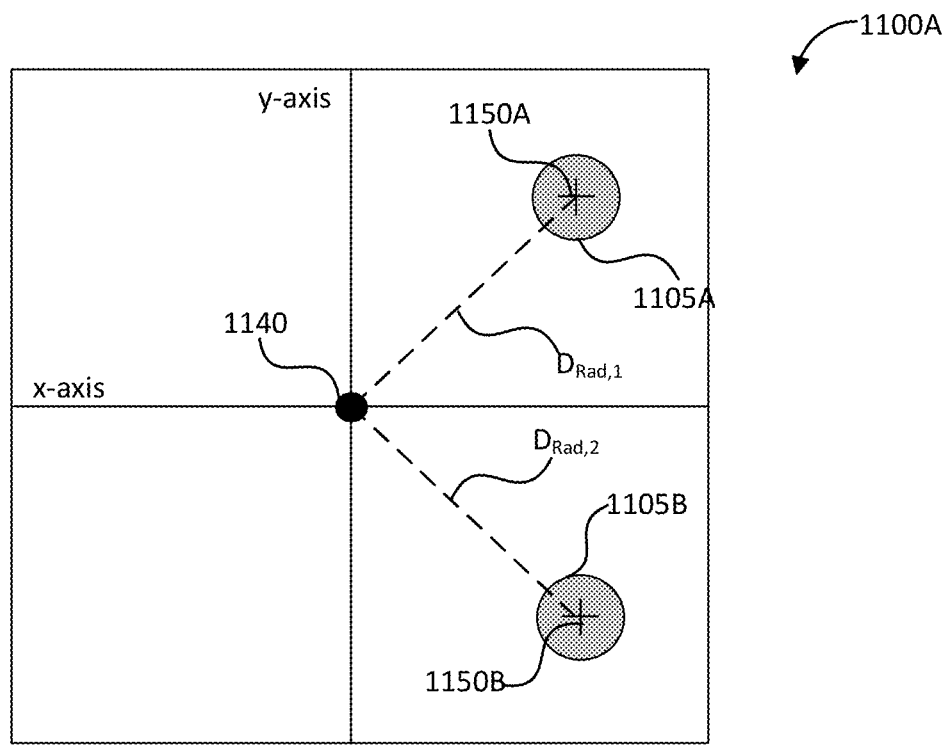
FIGS. 11A-B are diagrams illustrating computational images using an optical center to calculate a cleave angle according to an embodiment of the present invention.
Figure 11B:
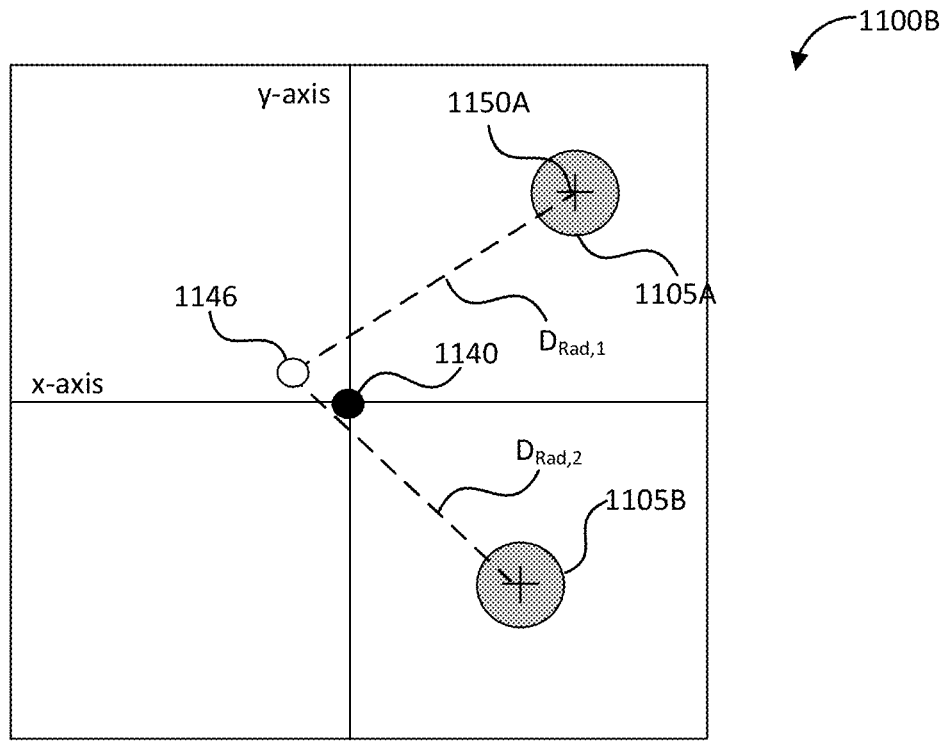

Turning now to FIGS. 11A-B, diagrams illustrating computational images using an optical center to calculate and/or verify a cleave angle according to an embodiment of the present invention are provided. For ease of discussion, FIGS. 11A-B are discussed with relation to FIGS. 8A-10; however, it should be understood that any systems or techniques disclosed herein may be applicable.

FIG. 11A provides computational image 1100A. As shown, the computational image 1100A includes two emission face measurements: emission face measurement 1105A and emission face measurement 1105B. The emission face measurements 1105A and the emission face measurement 1105B may be generated based on the reflected light 824 reflected off of the cleaved end 808 of the optical fiber 804 in a first position and a second position, respectively.

The emission face measurement 1105B may be generated to verify the validity of a cleave angle measurement calculated based on a first radial distance, $D_{Rad,1}$, for the emission face measurement 1105A. To verify the cleave angle measurement for the emission face measurement 1105A, a first centroid 1150A for the emission face measurement 1105A may be determined and a second centroid 1150B for the emission face measurement 1105B may be determined. Then, using the first centroid 1150A, a first radial distance, $D_{Rad,1}$, may be determined for the emission face measurement 1105A. Similarly, using the second centroid 1150B, a second radial distance, $D_{Rad,2}$, may be determined for the emission face measurement 1105B.

As discussed above, a radial distance may be determined as the distance from the centroid of an emission face to the optical center. Thus, in a first example embodiment, the first radial distance, $D_{Rad,1}$, may be determined from the first centroid 1150A to the optical center 1140, and the second radial distance, $D_{Rad,2}$, may be determined from the second centroid 1150B to the optical center 1140. If the first radial distance, $D_{Rad,1}$, and the second radial distance, $D_{Rad,2}$, are equal, then the emission face measurement 1105B may be validated. The emission face measurement 1105B may be validated by the first radial distance, $D_{Rad,1}$, and the second radial distance, $D_{Rad,2}$, being equal because, as discussed above with reference to FIG. 10, as the optical fiber 804 is rotated, the emission face arc 1044 may be formed. If the emission face measurement 1105A and the emission face measurement 1105B are both valid, then the first centroid 1150A and the second centroid 1150B should have x-y coordinates along the same emission face arc. As such, the first radial distance, $D_{Rad,1}$, and the second radial distance, $D_{Rad,2}$, should be the same or within a threshold, as a radius of a circle is constant. Thus, if the first radial distance, $D_{Rad,1}$, and the second radial distance, $D_{Rad,2}$, are not equal, then one or both of the emission face measurement 1105A and the emission face measurement 1105B may be invalid.

In a second example embodiment, the emission face measurement 1105B may be validated via a different method. Turning now to FIG. 11B, a computational image 1100B may be the same as the computational image 1100A except that the emission face measurement 1105B may be captured in a different orientation. In this example, the first radial distance, $D_{Rad,1}$, and the second radial distance, $D_{Rad,2}$, may be determined by determining a point 1146 at which the first radial distance, $D_{Rad,1}$, and the second radial distance, $D_{Rad,2}$, are equal. If the point 1146 is not the same as the optical center 1140, then one or both of the emission face measurement 1105A and the emission face measurement 1105B may be an invalid measurement. To determine whether emission face measurement 1105A and/or emission face measurement 1105B is invalid, one or more emission face measurements may be taken and similarly validated.

Figure 12A:
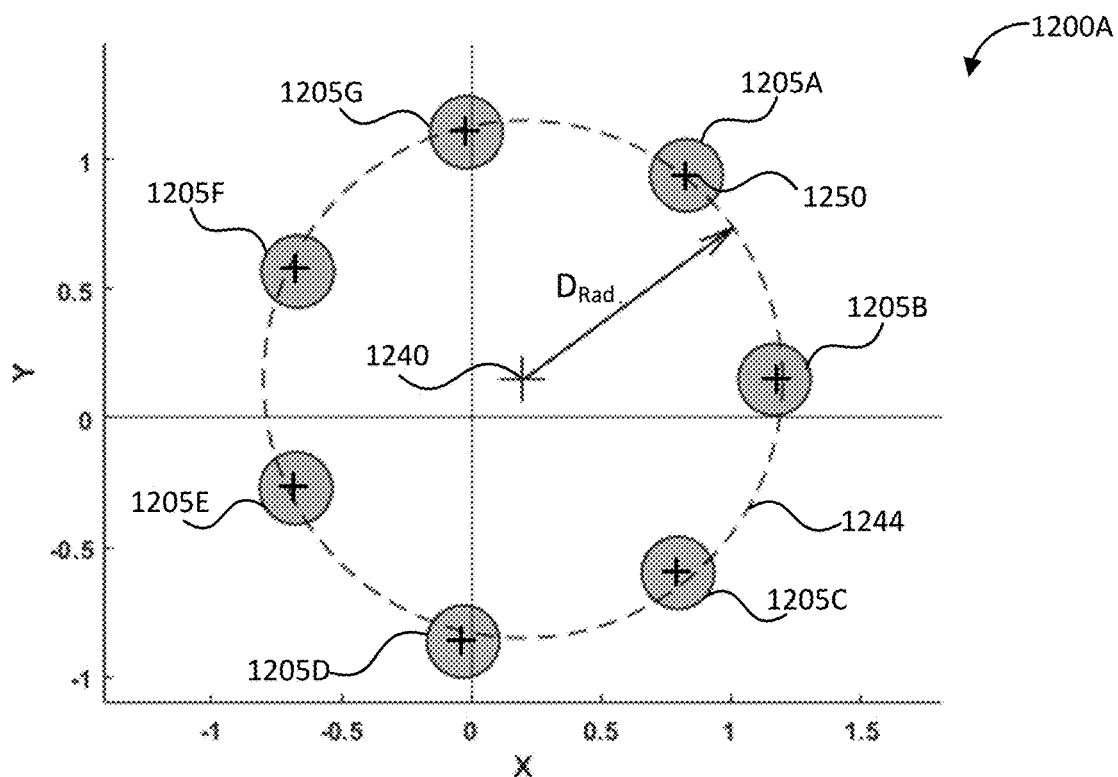
FIGS. 12A-B are diagrams illustrating computational images of multiple emission face measurements used to calculate a cleave angle based on one or more validity checks according to an embodiment of the present invention.
Figure 12B:
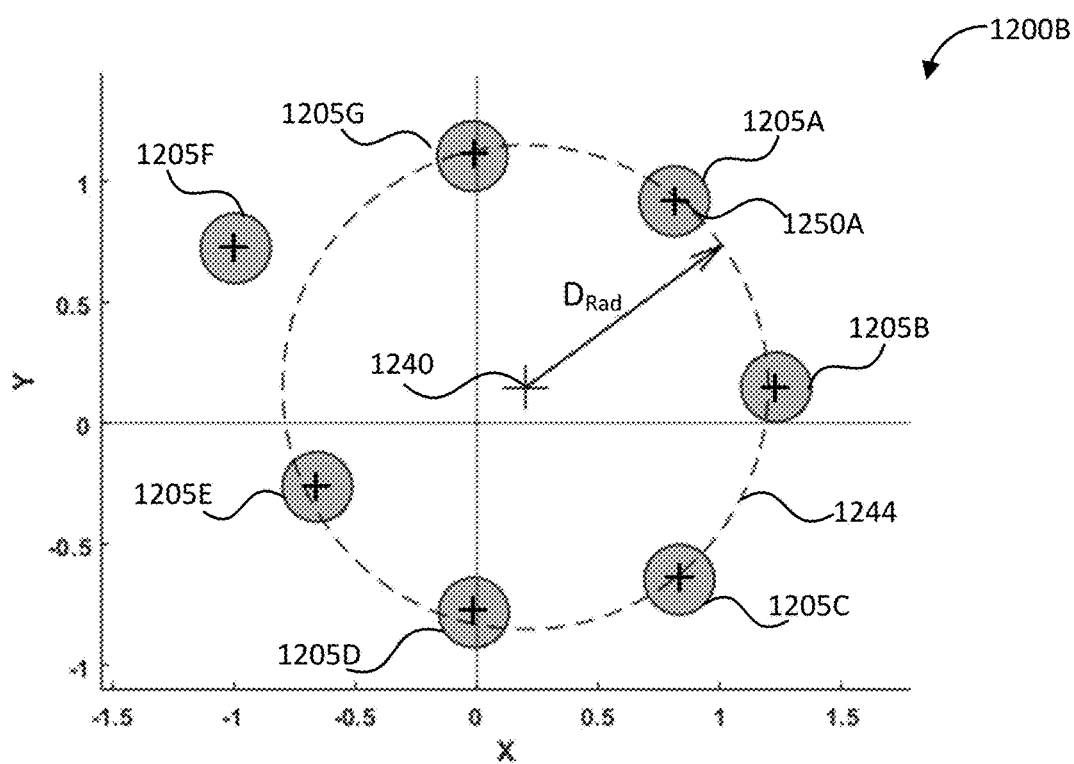

FIGS. 12A-B provide diagrams illustrating computational images of multiple emission face measurements used to calculate a cleave angle based on one or more validity checks, according to an embodiment of the present invention. For ease of discussion, FIGS. 12A-B are discussed with relation to FIGS. 8A-11B; however it should be understood that any systems or techniques disclosed herein may be applicable.

FIG. 12A provides a computational image 1200A. The computational image 1200A may include emission face measurements 1205A-G. The emission face measurements 1205A-G may be measured based on the cleaved end 808 of the optical fiber 804 being in various positions as the optical fiber 804 is rotated about an optical axis (e.g., x-axis). As shown by centroid 1250A corresponding to emission face measurement 1205A, a centroid may be determined for each of the emission face measurements 1205A-G.

In the embodiments illustrated in FIGS. 12A and 12B, the cleave angle measurement technique may not require a calibration procedure to determine an optical center 1240. Instead, the optical center 1240 may be determined based on the emission face measurements 1205A-G. For example, an emission face arc 1244 may be determined based on the centroids (e.g., centroid 1250A) for each of the emission face measurements 1205A-G. Then, the optical center 1240 may be determined as the center point of the emission face arc 1244.

Once the optical center 1240 is determined, a radial distance, $D_{Rad}$, may be determined for the emission face measurements 1205A-G. Using the radial distance, $D_{Rad}$, and the cleaved end distance, $D_{End}$, a cleave angle may be calculated for the optical fiber 804.

In some embodiments, one or more of the emission face measurements 1205A-G may not be valid. Turning now to FIG. 12B, a computational image 1200B is provided illustrating an embodiment including an invalid emission face measurement. An emission face measurement may be invalid for a variety of reasons, including noise in the cleave angle measurement system 800 or mis-positioning of the optical fiber 804 in the optical fiber channel 832. In an illustrative example, a piece of dust in the optical fiber channel 832 may cause for the cleaved end 808 to be placed in an improper position during the rotation of the optical fiber 804. As such, the emission face measurement 1205F corresponding to the improper position of the cleaved end 808 may be an invalid measurement.

To identify emission face measurement 1205F as an invalid measurement, the emission face arc 1244 may be determined. The emission face arc 1244 may be determined by aligning the centroids of as many emission face measurements as feasible. In the illustrated example, the emission face arc 1244 is formed by emission face measurements 1205A-E and 1205G. In an example where the emission face measurement 1205C was also invalid, then the emission face arc 1244 may be determined by aligning the centroids of the emission face measurements 1205A-B, 1205D-E, and 1205G. Any invalid emission face measurements, such as the emission face measurement 1205F, may be discarded. In some embodiments, an invalid emission face measurement may indicate that the cleave angle measurement system 800 would benefit from cleaning or repositioning prior to other measurements.

Figure 13A:
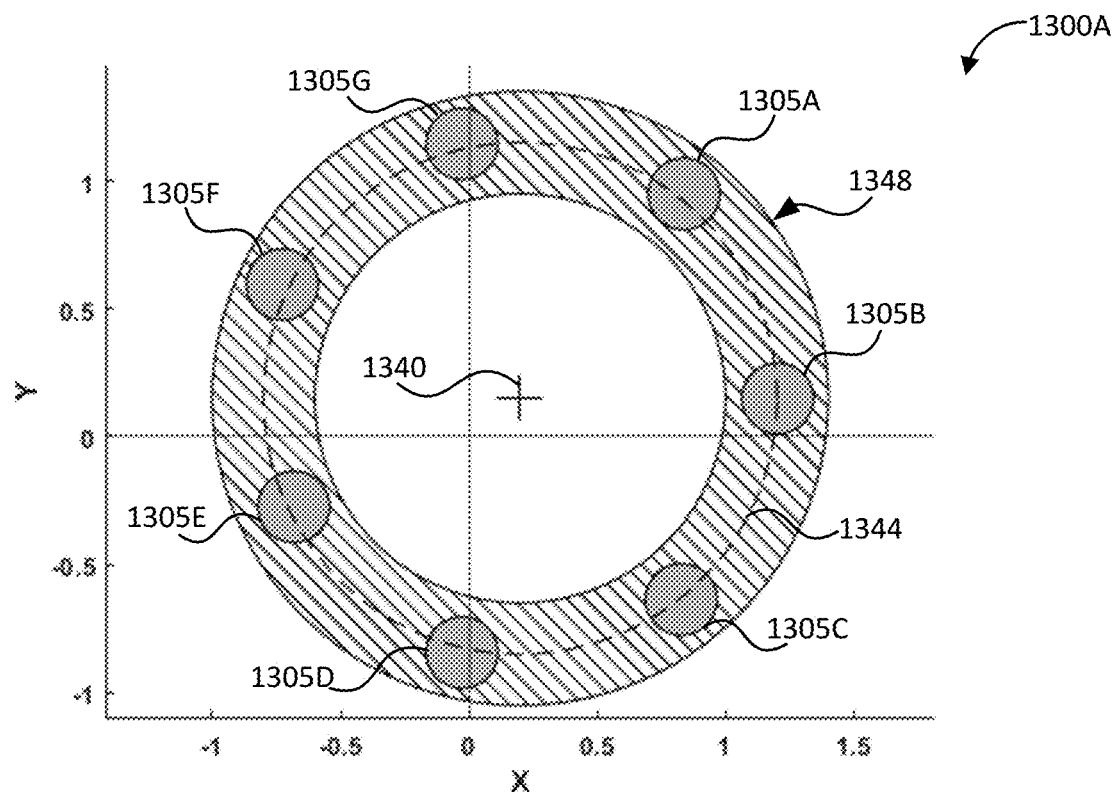
FIGS. 13A-B are diagrams illustrating computational images of multiple emission face measurements used to calculate a cleave angle verified against a threshold according to an embodiment of the present invention.
Figure 13B:
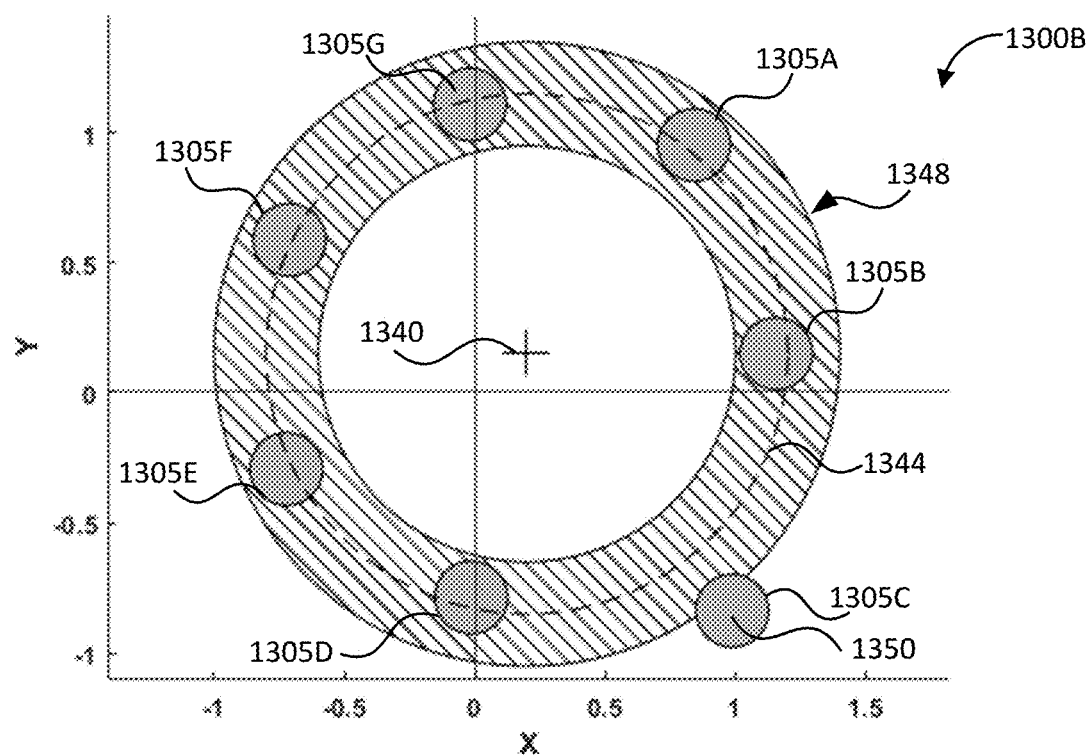

In other embodiments, emission face measurements, and thereby the cleave angle measurements, may be verified against a threshold. Turning now to FIGS. 13A-B, diagrams illustrating computational images of multiple emission face measurements used to calculate a cleave angle verified against a threshold according to an embodiment of the present invention are provided. For ease of discussion, FIGS. 13A-B are discussed with relation to FIGS. 8A and 12A-B; however, it should be understood that any systems or techniques disclosed herein may be applicable.

FIG. 13A provides a computational image 1300A. As shown, the computational image 1300A may include emission face measurements 1305A-G. The emission face measurements 1305A-G may be the same or similar to the emission face measurements 1205A-G. An emission face arc 1344 may be generated for the emission face measurements 1305A-G similar to the emission face arc 1244 as discussed above. Additionally, an optical center 1340 may be determined similar to the optical center 1240 as discussed above.

A threshold region 1348 may be determined for the emission face measurements 1305A-G. The threshold region 1348 may determine whether an emission face measurement within the emission face measurements 1305A-G is invalid or valid.

In some embodiments, the threshold region 1348 may be determined based on the DEng and the application requirements for cleave angle, $\theta_C$. Once the threshold region 1348 is determined, the emission face measurements 1305A-G may be compared to the threshold region 1348 to determine validity or acceptability of the measurements.

FIG. 13B provides a computational image 1300B in which emission face measurement 1305C may be invalid. As shown, the emission face measurement 1305C falls outside of the threshold region 1348. In some embodiments, if any portion of the emission face measurement 1305C falls outside of the threshold region 1348, then emission face measurement 1305C may be invalid and may be discarded. In other embodiments, the emission face measurement 1305C may be determined to be invalid only if a centroid 1350 of the emission face measurement 1305C or the entirety of the emission face measurement 1305C falls outside of the threshold region 1348.

In some embodiments, the cleave angle measurement system and techniques provided herein may be used to measure cleave angles for a plurality of optical fibers. For example, a cleave angle may be measured for each optical fiber in a fiber array. Turning now to FIGS. 14A-B, schematic diagrams illustrating a cleave angle measurement system according to an embodiment of the present invention are provided. For ease of discussion, FIGS. 14A-B are discussed with relation to FIGS. 8A and 10; however, it should be understood that any systems or techniques disclosed herein may be applicable.

FIGS. 14A and 14B illustrate a cleave angle measurement system 1400. The cleave angle measurement system 1400 may be configured to measure a cleave angle for multiple optical fibers: i.e., first optical fiber 1404A, second optical fiber 1404B, and third optical fiber 1404C. In an example embodiment, the cleave angle measurement system 1400 may be used to measure a cleave angle for one or more optical fibers in a fiber array. In such an example, first optical fiber 1404A, second optical fiber 1404B, and third optical fiber 1404C may be part of a fiber array.

The cleave angle measurement system 1400 may include an image sensor 1410 and a light source 1420. The image sensor 1410 may be the same or similar to the image sensor 810, and the light source 1420 may be the same or similar to the light source 820. In some embodiments, the light source 1420 may be capable of wavelength modulation or may be a broadband light source. Similar to the light source 820, the light source 1420 may be configured to emit light beam 1422. The light beam 1422 may be directed to second cleaved end 1408B of the second optical fiber 1404B.

In some embodiments, the light beam 1422 with a second wavelength may be directed to the second cleaved end 1408B by one or more optical components. For example, as illustrated, the cleave angle measurement system 1400 may include a grating 1416 which directs a diffracted light beam 1426B at an angle based on wavelength. The grating 1416 may be positioned to produce diffracted light beam 1426B with a second wavelength from the light source 1420 directed toward the second cleaved end 1408B.

In some embodiments, a collecting lens 1414 may be positioned between the grating 1416 and the second cleaved end 1408B. The collecting lens 1414 may be configured to collect and direct the diffracted light beam 1426B from the grating 1416 to the second cleaved end 1408B. In some embodiments, the collecting lens 1414 may be configured to collimate the diffracted light beam 1426B after diffraction from the grating 1416. In other embodiments, the collecting lens 1414 may be configured to filter out one or more wavelength ranges from the light beam 1422 such that a specific wavelength of the light beam 1422 reaches the second cleaved end 1408B.

After the diffracted light beam 1426B reaches the second cleaved end 1408B, the diffracted light beam 1426B may be reflected off of the second cleaved end 1408B as reflected light 1424B. The reflected light 1424B may be directed to the image sensor 1410 by a beam splitter 1440. The beam splitter 1440 may be the same or similar to the beam splitter 840.

Similar to the cleave angle measurement system 800, the cleave angle measurement system 1400 may measure a cleave angle of the second cleaved end 1408B by receiving the reflected light 1424B at the image sensor 1410. For example, the cleave angle measurement system 1400 may measure the cleave angle according to techniques discussed herein. For example, based on the reflected light 1424B received by the image sensor 1410, an emission face may be measured for the second cleaved end 1408B.

Since optical fibers within an array are often fixed in position, measuring a cleave angle of multiple fibers within an array may include modifying the transmission pathway of the light beam 1422. For example, turning now to FIG. 14B, an embodiment in which a cleave angle for the first optical fiber 1404A is measured is provided. Because first optical fiber 1404A, second optical fiber 1404B, and third optical fiber 1404C are fixed in place, to reflect light off of first cleaved end 1408A of the first optical fiber 1404A, the wavelength of the light beam 1422 may be modified.

To modify the transmission pathway of the light beam 1422 such that the light beam 1422 reflects off of first cleaved end 1408A, the light beam 1422 may be modified to have a first wavelength. Grating 1416 may produce diffracted light beam 1426A at a second angle based on the wavelength of light beam 1422. The collecting lens 1414 may be configured to collect and direct the diffracted light beam 1426A from the grating 1416 to the first cleaved end 1408A. For example, the collecting lens 1414 may position the diffracted light beam 1426A such that the diffracted light beam 1426A is transmitted to the first cleaved end 1408A.

After the diffracted light beam 1426A reaches the first cleaved end 1408A, the diffracted light beam 1426A may be reflected off of the first cleaved end 1408A as reflected light 1424A. The reflected light 1424A may be directed to the image sensor 1410 by a beam splitter 1440. The beam splitter 1440 may be the same or similar to the beam splitter 840.

Similar to the cleave angle measurement system 800, the cleave angle measurement system 1400 may measure a cleave angle of the first cleaved end 1408A by receiving the reflected light 1424A at the image sensor 1410. For example, the cleave angle measurement system 1400 may measure the cleave angle according to techniques discussed herein. For example, based on the reflected light 1424A received by the image sensor 1410, an emission face may be measured for the first cleaved end 1408A.

The collecting lens 1414 may be positioned to collect the diffracted light beam 1426A regardless of where the light beam 1422 contacts the grating 1416. Similarly, the beam splitter 1440 may be positioned so that the reflected light 1424A reflected from the first cleaved end 1408A is directed to the image sensor 1410. A cleave angle for the first cleaved end 1408A may be calculated based on an emission face measurement gathered from the reflected light 1424A received by the image sensor 1410, as disclosed herein.

Since optical fibers in a fiber array are difficult to rotate, a calibration optical fiber may be used to calibrate the cleave angle measurement system 1400. For example, the cleave angle measurement system 1400 may be calibrated according to the techniques discussed above with reference to FIG. 10. Then, once the cleave angle measurement system 1400 is calibrated, a cleave angle for each of first optical fiber 1404A, second optical fiber 1404B, and third optical fiber 1404C may be measured without requiring rotation of each optical fiber.

Figure 15A:
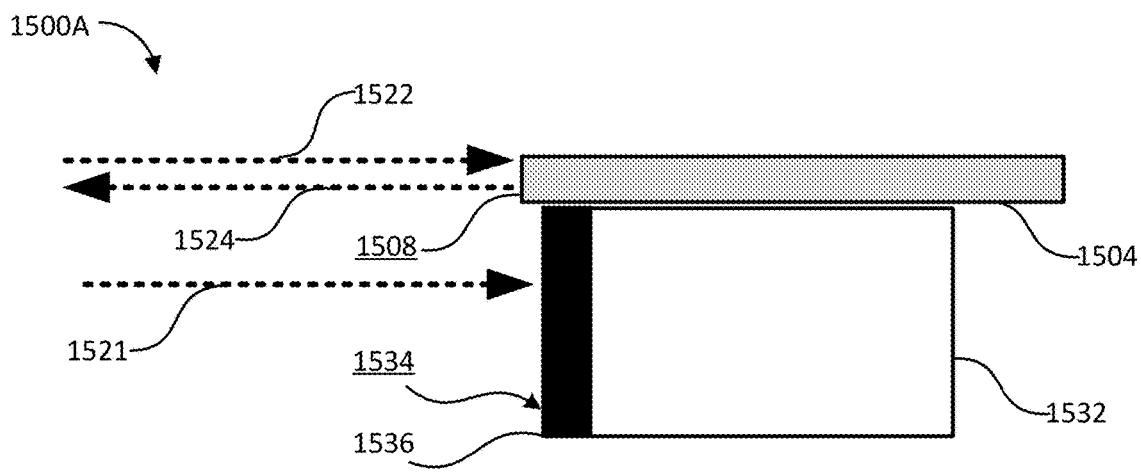
FIGS. 15A-C are schematic diagrams illustrating various optical fiber channel arrangements according to an embodiment of the present invention.
Figure 15B:
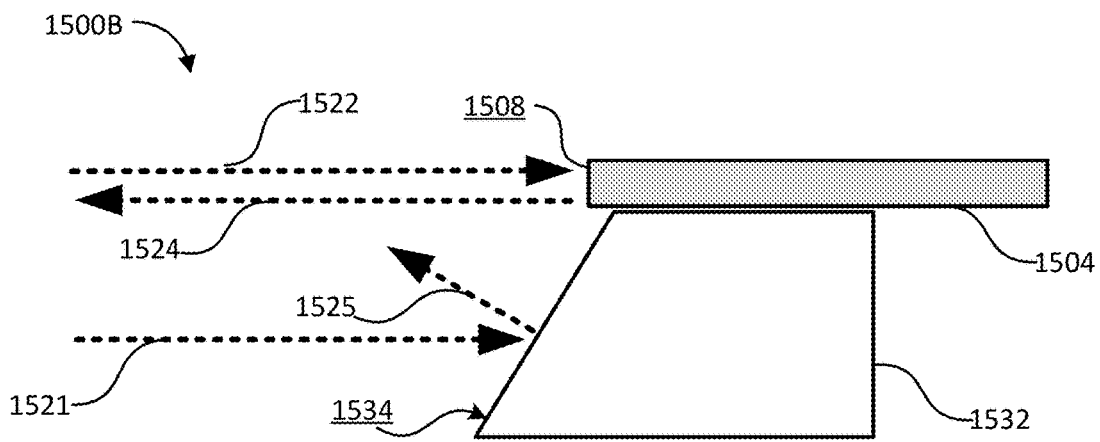
Figure 15C:
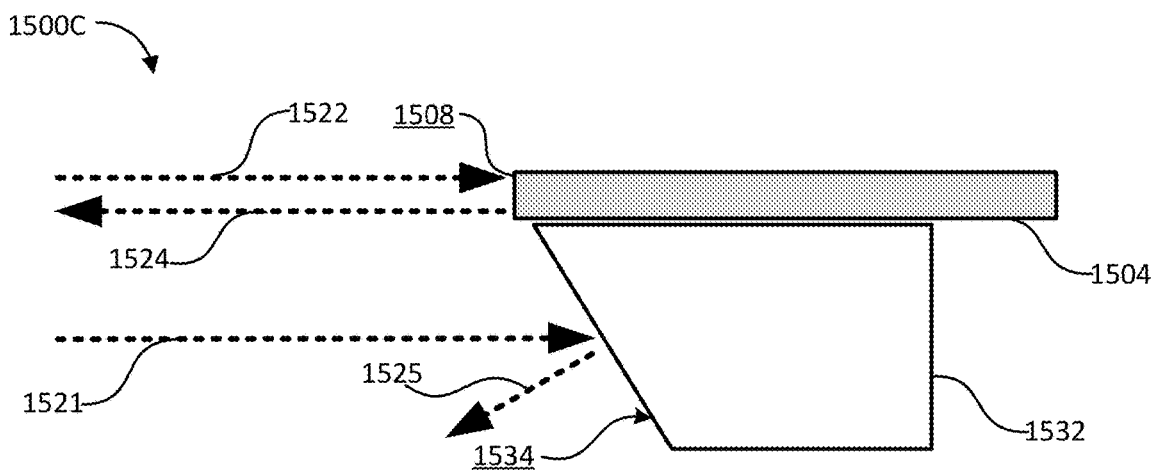

Turning now to FIGS. 15A-C, schematic diagrams illustrating various optical fiber channel arrangements according to an embodiment of the present invention are provided. For ease of discussion, FIGS. 15A-B are discussed with relation to FIG. 8; however it should be understood that any systems or techniques disclosed herein may be applicable.

The light beam 1522 from a light source, for example, light source 820, may be reflected off of a cleaved end 1508 to determine the cleave angle of the optical fiber 1504. To increase the accuracy of the cleave angle measurement, it may be advantageous to reduce or minimize the amount of light beam 1522 that is reflected off of surfaces that are not the cleaved end 1508. FIGS. 15A-C provide various modifications that may be made to surface 1534 of the optical fiber channel 1532 to reduce or minimize reflection of the light beam 1522 off of non-cleaved end surfaces. The optical fiber channel 1532 may be the same or similar to the optical fiber channel 832. The light beam 1522 may be the same or similar to the light beam 822 in that the light beam 1522 may be emitted by a light source, such as the light source 820. Optical fiber 1504 may be disposed in the optical fiber channel 1532 such that a cleaved end 1508 is oriented to receive the light beam 1522 emitted from the light source. The optical fiber 1504 may be the same or similar to the optical fiber 804.

FIG. 15A illustrates an embodiment 1500A in which the surface 1534 of the optical fiber channel 1532 is blackened or otherwise darkened. For example, the surface 1534 may include a dark section 1536. The dark section 1536 may be light absorbing in order to absorb light beam 1521. The light beam 1521 may be a portion of the light beam 1522 that does not contact the cleaved end 1508 of the optical fiber 1504. To prevent the light beam 1521 from reflecting off of the surface 1534, the dark section 1536 may absorb the light beam 1521. In an example embodiment, the dark section 1536 may be a coating that is applied to the surface 1534.

In other embodiments, the surface 1534 may be angled to reflect the light beam 1521 at an angle that is different than the reflected light 1524. FIGS. 15B and 15C illustrate embodiments 1500B and 1500C in which the surface 1534 are angled in order to direct any reflected light 1525 from the light beam 1521 at an orientation that is different from the transmission angle of the reflected light 1524. By reflecting the light beam 1521 at a transmission angle that is different from the reflected light 1524, the reflected light 1525 may be directed away from an image sensor, such as the image sensor 810, and thereby not received by the image sensor. Depending on the arrangement of the cleave angle measurement system, the surface 1534 may be angled in a first direction, as illustrated by the embodiment 1500B, or in a second direction, as illustrated by the embodiment 1500C.

Figure 16:
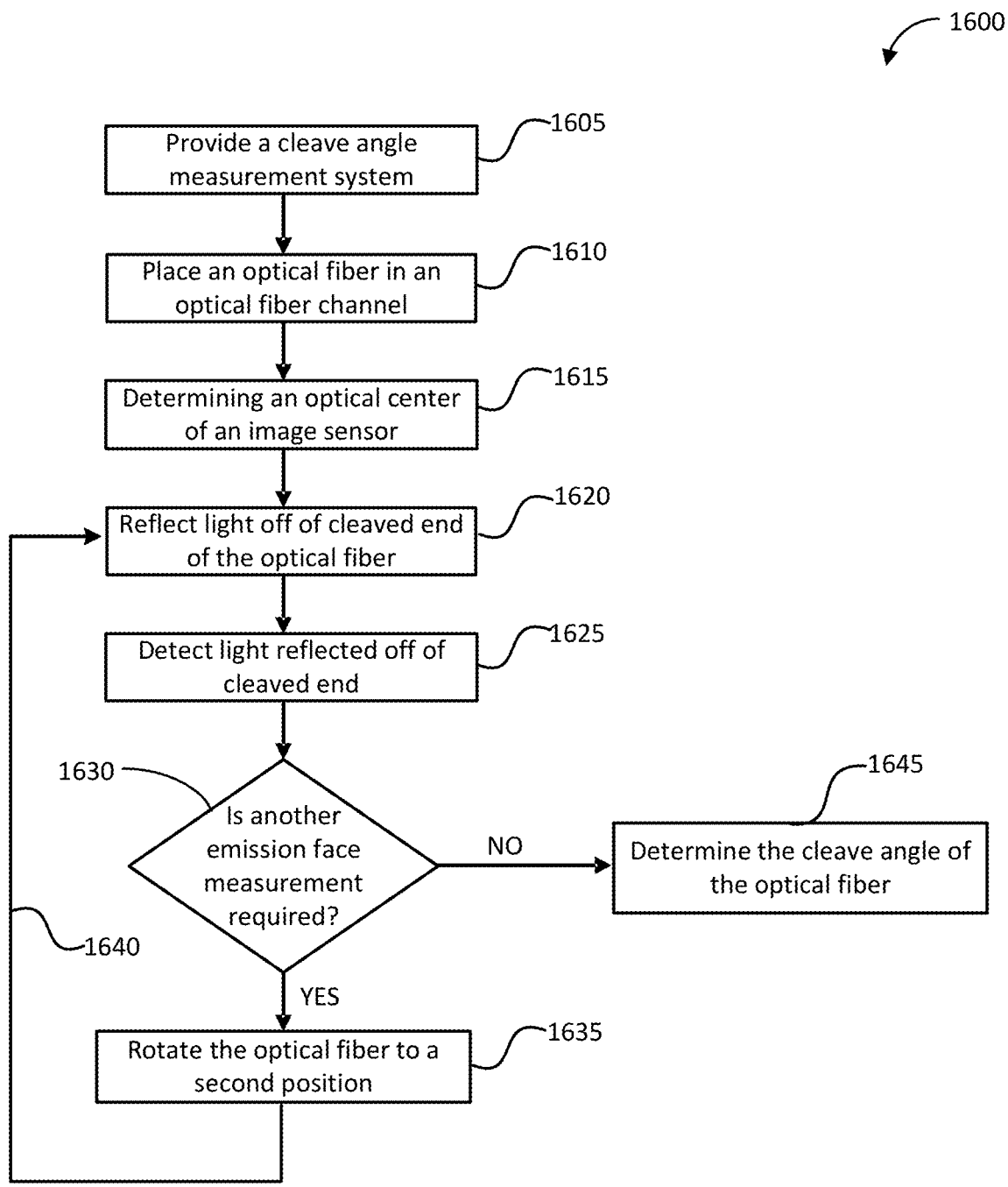
FIG. 16 is a simplified flowchart illustrating a method of measuring a cleave angle of an optical fiber using a cleave angle measurement system according to an embodiment of the present invention.

FIG. 16 is a simplified flowchart illustrating a method 1600 for measuring a cleave angle of an optical fiber using a cleave angle measurement system according to an embodiment of the present invention. For ease of discussion, FIG. 16 is discussed with reference to FIG. 8A, however, it should be understood that any systems and techniques described herein may be applied.

The method 1600 may include steps 1605 and 1610. At step 1605, a cleave angle measurement system 800 may be provided. The cleave angle measurement system 800 may include an optical fiber channel 832, an image sensor 810, and a light source 820. At step 1610, an optical fiber 804 may be placed into the optical fiber channel 832. The optical fiber 804 may include a cleaved end 808 and may be positioned such that the cleaved end 808 is in optical alignment with the light source 820. In some embodiments, the cleave angle measurement system 800 may also include a beam splitter 840. In such embodiments, the method 1600 may also include transmitting light from the light source 820 through the beam splitter 840, reflecting light off of the cleaved end 808 of the optical fiber 804, and reflecting, by the beam splitter 840, the light reflected off of the cleaved end 808 of the optical fiber 804 to the image sensor 810.

In still other embodiments, the cleave angle measurement system 800 may also include a beam collector 850. In such embodiments, the method 1600 may also include collecting, by the beam collector 850, stray light generated by the light reflecting off of the cleaved end 808 of the optical fiber 804.

In some embodiments, the method 1600 may also include, prior to placing the optical fiber 804 in the optical fiber channel 832, removing a jacket 803 from the cleaved end 808 of the optical fiber 804 to expose a fiber core/cladding 802 (e.g., the inner portion of the optical fiber with the coating removed) of the optical fiber 804. For example, a longitudinal length, L, of the fiber core/cladding 802 of the optical fiber 804 that is exposed may be between 5 to 20 mm. In such embodiments, the method 1600 may further include securing the fiber core/cladding 802 of the optical fiber 804 in the optical fiber channel 832.

The method 1600 may also include determining an optical center of an image sensor 810 at step 1615. The optical center of an image sensor 810 may be determined by a variety of techniques. For example, in some embodiments, determining an optical center of the image sensor 810 may include generating, based on the light detected by the image sensor 810, a first emission face measurement for the cleaved end 808 of the optical fiber 804 in a first position, computing a first optical centroid of the first emission face measurement, determining a first radial distance for the first emission face measurement of the optical fiber 804, and computing, based on the first radial distance, the cleave angle for the cleaved end 808 of the optical fiber 804. After determining the first optical centroid for the first emission face measurement in the first position, the method can include rotating the optical fiber 804 to a second position. Then, based on light reflected off of the cleaved end 808 of the optical fiber 804, a second emission face measurement for the optical fiber 804 in the second position may be generated and a second optical centroid of the second emission face measurement may be computed. In some embodiments, the optical fiber 804 may be further rotated to a third position, and based on light reflected off of the cleaved end 808 of the optical fiber 804, a third emission face measurement for the optical fiber 804 in the third position may be generated, and a third optical centroid of the third emission face measurement may be generated therefrom. The optical center of the image sensor 810 may be determined based on the first optical centroid, the second optical centroid, and the third optical centroid.

In other embodiments, the optical center of the image sensor 810 may be determined by a calibration technique. In such an embodiment, the method 1600 may include placing a calibration optical fiber in a first position in the optical fiber channel 832, where the calibration optical fiber comprises a cleaved end with a known cleave angle. The image sensor 810 may detect light reflected off of the cleaved end of the calibration optical fiber and a first emission face measurement for the calibration optical fiber in the first position may be generated based on the light detected by the image sensor 810. Then the calibration optical fiber may be rotated to a second position. In the second position, a second emission face measurement may be generated for the calibration optical fiber in the second position based on light reflected off of the cleaved end of the calibration optical fiber. The optical center of the image sensor 810 may be determined based on the first emission face measurement and the second emission face measurement. In embodiments involving the calibration technique, the step 1615 may be performed prior to steps 1605 and 1610.

The method 1600 may include steps 1620 and 1625. At step 1620, light may be reflected off of the cleaved end 808 of the optical fiber 804. The light may be provided by the light source 820. At step 1625, the image sensor 810 may detect the light reflected off of the cleaved end 808 of the optical fiber.

In some embodiments, the method 1600 may include step 1630 at which a determination of whether another emission face measurement is utilized. To determine whether another emission face measurement is utilized, an emission face measurement may be generated and a determination may be made whether the emission face measurement is valid. For example, the method 1600 may include generating, based on the light detected by the image sensor 810, a first emission face measurement for the cleaved end 808 of the optical fiber 804 in a first position, computing a first optical centroid of the first emission face measurement, and determining a first radial distance for the first emission face measurement of the optical fiber 804.

In some embodiments, the determination may be made that another emission face measurement is to be performed. In such embodiments, the method 1600 may continue to step 1635 and the optical fiber 804 may be rotated to a second position. After the optical fiber 804 is rotated to the second position, the method may return via iteration step 1640 to step 1620. For example, the method 1600 may include rotating the optical fiber 804 to the second position (step 1635) and then generating, based on light reflected off of the cleaved end 808 of the optical fiber 804, a second emission face measurement for the optical fiber 804 in the second position. A second optical centroid of the second emission face measurement may be computed and a determination may be made whether the first emission face measurement or the second emission face measurement are valid (step 1630).

Determining whether the first emission face measurement or the second emission face measurement are valid may include determining a circular radius based on the optical center, determining a second radial distance for the second emission face measurement based on the circular radius, and determining whether the second radial distance and the first radial distance align at the optical center. In other embodiments, determining whether the first emission face measurement or the second emission face measurement are valid may include determining whether the first emission face measurement is within a threshold and determining whether the second emission face measurement is within the threshold.

In other embodiments, the determination, based on the first radial distance and the first centroid, may be made that no other emission face measurement is to be performed. In such embodiments, the method 1600 may continue to step 1645. At step 1645, the method may include computing, based on the first radial distance, the cleave angle for the cleaved end 808 of the optical fiber 804. As noted above, the cleave angle measurement system provides for accurate cleave angle measurements with precision down to a 0.5 degree or less angle measurement.

It should be appreciated that the specific steps illustrated in FIG. 16 provide a particular method of measuring a cleave angle of an optical fiber using a cleave angle measurement system according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
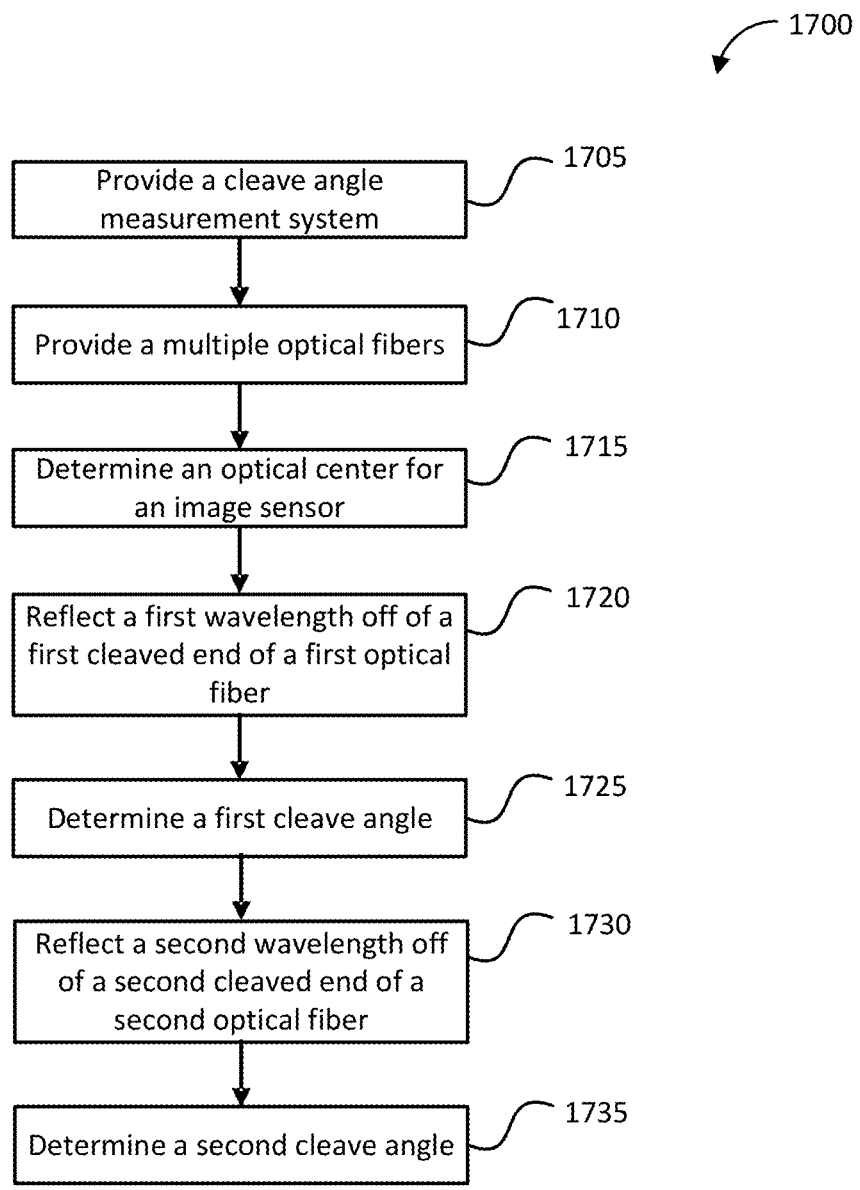
FIG. 17 is a simplified flowchart illustrating a method of measuring a cleave angle of a plurality of optical fibers using a cleave angle measurement system according to an embodiment of the present invention.

FIG. 17 is a simplified flowchart illustrating a method 1700 of measuring a cleave angle of a plurality of optical fibers using a cleave angle measurement system according to an embodiment of the present invention. For ease of discussion, FIG. 17 is discussed with reference to FIG. 14A-B; however, it should be understood that any systems and techniques described herein may be applied.

The method 1700 may include steps 1705 and 1710. At step 1705, the method 1700 may include providing a cleave angle measurement system 1400. The cleave angle measurement system 1400 may include a first optical fiber channel, a second optical fiber channel, an image sensor 1410, and a light source 1420. At step 1710, multiple optical fibers, e.g., first optical fiber 1404A, second optical fiber 1404B, and third optical fiber 1404C, may be provided. For example, the first optical fiber 1404A may be placed in the first optical fiber channel and the second optical fiber 1404B may be placed in the second optical fiber channel. In some embodiments, the first optical fiber 1404A, the second optical fiber 1404B, and the third optical fiber 1404C may be part of an optical fiber array.

Each of the first optical fiber 1404A, the second optical fiber 1404B, and the third optical fiber 1404C may include a cleaved end. For example, the first optical fiber 1404A may include a first cleaved end 1408A and the second optical fiber 1404B may include a second cleaved end 1408B. The first cleaved end 1408A and the second cleaved end 1408B may be positioned facing the light source 1420.

In some embodiments, the method 1700 may also include, prior to placing the first optical fiber 1404A in the first optical fiber channel, removing a coating from the first cleaved end 1408A of the first optical fiber 1404A to expose an inner portion of the first optical fiber 1404A. A coating may also be removed from the second cleaved end 1408B of the second optical fiber 1404B to expose an inner portion of the second optical fiber 1404B. For example, a longitudinal length, L, of the inner portion of the first optical fiber 1404A and the second optical fiber 1404B that is exposed may be between 5 mm and 20 mm. In such embodiments, the method 1700 may further include securing the first optical fiber 1404A and the second optical fiber 1404B by the respective inner portions.

In some embodiments, the cleave angle measurement system 1400 may also include a beam splitter 1440. In such embodiments, the method 1700 may also include transmitting the first wavelength and the second wavelength from the light source 1420 through the beam splitter 1440, reflecting the first wavelength off of the first cleaved end 1408A, reflecting the second wavelength off of the second cleaved end 1408B, and reflecting, by the beam splitter 1440, the first wavelength reflected off of the first cleaved end 1408A and the second wavelength reflected off of the second cleaved end 1408B to the image sensor 1410.

In still other embodiments, the cleave angle measurement system 1400 may also include a grating 1416. In such embodiments, the grating 1416 may be positioned to direct the first wavelength from the light source 1420 to the first cleaved end 1408A of the first optical fiber 1404A and direct the second wavelength from the light source 1420 to the second cleaved end 1408B of the second optical fiber 1404B.

In embodiments in which the cleave angle measurement system 1400 includes the grating 1416, the cleave angle measurement system 1400 may further include a collecting lens 1414 positioned between the grating 1416 and the beam splitter 1440. In such embodiments, the method 1700 may include transmitting a light beam from the light source 1420, where the light beam includes the first wavelength and the second wavelength, diffracting, by the grating 1416, the light beam 1422 such that the collecting lens 1414 selectively positions the diffracted light beam 1426B to transmit onto first cleaved end 1408A, and diffracting, by the grating 1416, the light beam 1422 such that the collecting lens 1414 selectively positions the diffracted light beam 1426A onto first cleaved end 1408A.

The method 1700 may include step 1715 at which an optical center for the image sensor 1410 may be determined. For example, the optical center for the image sensor 1410 may be determined by any of the methods or techniques described herein, such as those described with reference to FIG. 10.

The method 1700 may include step 1720. At step 1720, the method 1700 may include reflecting a first wavelength transmitted by the light source 1420 off of the first cleaved end 1408A of the first optical fiber 1404A. Then, at step 1725, the method 1700 may include determining, based on the first wavelength reflected off of the first cleaved end 1408A, a first cleave angle for the first cleaved end 1408A. For example, determining the first cleave angle for the first cleaved end 1408A may include detecting, by the image sensor 1410, the first wavelength reflected off of the first cleaved end of the first optical fiber; generating, based on the first wavelength detected by the image sensor 1410, a first emission face measurement for the first cleaved end 1408A of the first optical fiber 1404A in a first position; computing a first optical centroid of the first emission face measurement; determining a first radial distance for the first emission face measurement of the first optical fiber 1404A; and computing, based on the first radial distance, the first cleave angle. The first radial distance for the first emission face measurement may be based on the optical center of the image sensor 1410.

The method 1700 may also include steps 1730 and 1735. At step 1730, the method 1700 may include reflecting the second wavelength transmitted by the light source 1420 off of the second cleaved end 1408B of the second optical fiber 1404B. Then, at step 1735, the method 1700 may include determining, based on the second wavelength reflected off of the second cleaved end 1408B, a second cleave angle for the second cleaved end 1408B. In example embodiments, the first wavelength may be different from the second wavelength.

It should be appreciated that the specific steps illustrated in FIG. 17 provide a particular method of measuring a cleave angle of a plurality of optical fibers using a cleave angle measurement system according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of aligning an optical fiber, the method comprising:
providing an optical fiber having a first end and a second end, wherein the first end of the optical fiber comprises a predefined manufacturing property;
positioning the optical fiber such that the first end of the optical fiber faces a microlens array (MLA) alignment system, wherein the MLA alignment system comprises:
a tilt sensing device; and
a position sensing device;
emitting a light beam from the first end of the optical fiber toward the MLA alignment system;
generating a reference output from the MLA alignment system based on the light beam, wherein the reference output comprises at least one of a tilt measurement or a position measurement;
thereafter, providing a microlens array (MLA) having a plurality of lenslets in a first position between the first end of the optical fiber and the MLA alignment system;
generating a first MLA beam output for the first position of the MLA, wherein the first MLA beam output comprises at least one of a first MLA tilt value or a first MLA position value; and
comparing the first MLA beam output with an alignment threshold.

2. The method of claim 1, wherein providing the MLA in the first position between the first end of the optical fiber and the MLA alignment system comprises placing the MLA in the first position such that the light beam emitting from the first end of the optical fiber transmits through a lenslet of the plurality of lenslets.

3. The method of claim 1, wherein generating the reference output from the MLA alignment system based on the light beam comprises:
positioning the optical fiber in a first position;
measuring, via the tilt sensing device, a first tilt measurement based on the light beam emitted from the first end of the optical fiber in the first position;
measuring, via the position sensing device, a first position measurement based on the light beam emitted from the first end of the optical fiber in the first position;
comparing the first tilt measurement to a tilt threshold; and
comparing the first position measurement to a position threshold.

4. The method of claim 3, further comprising:
positioning the optical fiber in a second position;
measuring, via the tilt sensing device, a second tilt measurement from the tilt sensing device based on the light beam emitted from the first end of the optical fiber;
measuring, via the position sensing device, a second position measurement based on the light beam emitted from the first end of the optical fiber in the first position;
comparing the second tilt measurement to the tilt threshold; and
comparing the second position measurement to the position threshold.

5. The method of claim 3, wherein the reference output comprises the first tilt measurement and the first position measurement.

6. The method of claim 3, wherein positioning the optical fiber in the first position comprises moving the optical fiber along at least one of a x-axis, a y-axis, z-axis, w-rotation, u-rotation, or v-rotation.

7. The method of claim 1, wherein generating the first MLA beam output for the first position of the MLA comprises:
measuring, via the tilt sensing device, the first MLA tilt value for the MLA at the first position;
measuring, via the position sensing device, the first MLA position value for the MLA at the first position;
comparing the first MLA tilt value to an MLA tilt threshold; and
comparing the first MLA position value to an MLA position threshold, wherein the alignment threshold comprises the MLA tilt threshold and the MLA position threshold.

8. The method of claim 7, further comprising:
moving, based on the first MLA beam output, the MLA from the first position to a second position;
generating a second MLA beam output for the second position of the MLA, wherein generating the second MLA beam output comprises:
measuring, via the tilt sensing device, a second MLA tilt value for the MLA at the second position;
measuring, via the position sensing device, a second MLA position value for the MLA at the second position; and
comparing the second MLA beam output to the alignment threshold, wherein comparing the second MLA beam output to the alignment threshold comprises:
comparing the second MLA tilt value to the MLA tilt threshold; and
comparing the second MLA position value to the MLA position threshold.

9. The method of claim 7, wherein moving the MLA from the first position to the second position comprises moving the MLA along at least one of a x-axis, a y-axis, a z-axis, a w-rotation, a u-rotation, or a v-rotation.

10. The method of claim 1, wherein the MLA alignment system further comprises a beam splitter and a collecting lens and wherein emitting the light beam from the first end of the optical fiber further comprises:
   transmitting a first portion of the light beam from the first end of the optical fiber through the beam splitter before reaching the position sensing device; and
   reflecting a second portion of the light beam from the first end of the optical fiber off of the beam splitter and through the collecting lens before reaching the tilt sensing device.

11. The method of claim 1, wherein the predefined manufacturing property of the first end of the optical fiber comprises a predefined cleave angle.

12. The method of claim 1, further comprising attaching a first end of a second optical fiber to a lenslet of the plurality of lenslets of the MLA.

13. The method of claim 1, further comprising attaching the first end of the optical fiber to a lenslet of the plurality of lenslets of the MLA.

14. A method of aligning an optical fiber array, the method comprising:
   providing a plurality of optical fibers, wherein the plurality of optical fibers comprises:
      a first optical fiber having a first end and a second end; and
      a second optical fiber having a third end and a fourth end;
   positioning the first optical fiber such that the first end of the optical fiber faces an MLA alignment system, wherein, the MLA alignment system comprises:
      a tilt sensing device; and
      a position sensing device;
   providing a microlens array (MLA) having a plurality of lenslets in a first MLA position between the first end of the first optical fiber and the MLA alignment system, wherein the plurality of lenslets comprises a first lenslet and a second lenslet;
   adjusting the first end of the first optical fiber into coarse alignment with the first lenslet of the plurality of lenslets;
   generating a first MLA beam output for the first optical fiber, wherein the first MLA beam output comprises at least one of a first MLA tilt value or a first MLA position value;
   comparing the first MLA beam output with an alignment threshold, wherein the alignment threshold comprises at least one of an MLA tilt threshold or an MLA position threshold;
   attaching the first end of the first optical fiber to a surface of the first lenslet; and
   moving the MLA to a second MLA position between the third end of the second optical fiber and the MLA alignment system such that the third end of the second optical fiber is in coarse alignment with the second lenslet.

15. The method of claim 14, wherein:
   generating the first MLA beam output for the first optical fiber comprises:
      measuring, via the tilt sensing device, the first MLA tilt value; and
      measuring, via the position sensing device, the first MLA position value; and
   comparing the first MLA beam output with an alignment threshold comprises:
      comparing the first MLA tilt value to an MLA tilt threshold; and
      comparing the first MLA position value to an MLA position threshold, wherein the alignment threshold comprises the MLA tilt threshold and the MLA position threshold.

16. The method of claim 15, further comprising:
   moving, based on the first MLA beam output, the first optical fiber to a second fiber position;
   generating a second MLA beam output for the first optical fiber in the second fiber position, wherein generating the second MLA beam output comprises:
      measuring, via the tilt sensing device, a second MLA tilt value from the tilt sensing device; and
      measuring, via the position sensing device, a second MLA position value; and
   comparing the second MLA beam output to the alignment threshold, wherein
   comparing the second MLA beam output to the alignment threshold comprises: comparing the second MLA tilt value to the MLA tilt threshold; and
   comparing the second MLA position value to the MLA position threshold.

17. The method of claim 16, wherein the plurality of optical fibers comprises a third optical fiber having a fifth end and a sixth end and the plurality of lenslets comprise a third lenslet, the method further comprising:
   attaching the third end of the second optical fiber to a surface of the second lenslet; and
   moving the MLA to a third MLA position between the fifth end of the third optical fiber and the MLA alignment system such that the fifth end of the third optical fiber is in coarse alignment with the third lenslet.

18. The method of claim 14, wherein moving the first optical fiber to a second fiber position comprises moving the first optical fiber along an x-axis, a y-axis, a z-axis, a w-rotation, a u-rotation, or a v-rotation.

19. The method of claim 14, wherein the MLA alignment system further comprises a beam splitter and a collecting lens and the method further comprises emitting a light beam from the first end of the first optical fiber, wherein emitting the light beam from the first end of the first optical fiber comprises:
   transmitting a first portion of the light beam from the first end of the first optical fiber through the beam splitter before reaching the position sensing device; and
   reflecting a second portion of the light beam from the first end of the first optical fiber off of the beam splitter and through the collecting lens before reaching the tilt sensing device.

20. The method of claim 14, wherein adjusting the first end of the first optical fiber into coarse alignment with the first lenslet comprises positioning the first end of the first optical fiber at a predetermined distance from the surface of the first lenslet.

* * * * *

UNITED STATES PATENT AND TRADEMARK OFFICE
CERTIFICATE OF CORRECTION

Page 1 of 1

PATENT NO.        : 12,379,545 B2
APPLICATION NO.   : 18/125633
DATED             : August 5, 2025
INVENTOR(S)       : Joseph Lawson, Christopher P. Brophy and Jordan Leidner It is certified that error appears in the above-identified patent and that said Letters Patent is hereby corrected as shown below:

In the Specification

Please insert the following heading and paragraph in Column 1, Line 17 of the description, immediately following the first full paragraph:
--STATEMENT REGARDING FEDERALLY SPONSORED RESEARCH OR DEVELOPMENT
This invention was made with Government support under Contract N68936-19-F-0001 awarded by The United States Navy. The Government has certain rights in the invention.--

Signed and Sealed this
Third Day of February, 2026

John A. Squires
*Director of the United States Patent and Trademark Office*